(12) United States Patent
Auld et al.

(10) Patent No.: US 6,327,000 B1
(45) Date of Patent: Dec. 4, 2001

(54) EFFICIENT IMAGE SCALING FOR SCAN RATE CONVERSION

(75) Inventors: David Auld, San Jose; Gerard K. Yeh, Redwood City; Peter Trajmar, San Jose; C. Dardy Chang, Mountain View; Meng-Day Yu, Palo Alto, all of CA (US)

(73) Assignee: Teralogic, Inc., Mountain View, CA (US)

( * ) Notice: Subject to any disclaimer, the term of this patent is extended or adjusted under 35 U.S.C. 154(b) by 0 days.

(21) Appl. No.: 09/285,491

(22) Filed: Apr. 2, 1999

(51) Int. Cl.[7] ............... H04N 7/01; H04N 9/74; H04N 11/20
(52) U.S. Cl. .......... 348/441; 348/445; 348/448; 348/458; 348/581
(58) Field of Search ................ 348/441, 445, 348/448, 458, 581; H04N 7/01, 11/20, 9/74

(56) References Cited

U.S. PATENT DOCUMENTS

| | | | |
|---|---|---|---|
| 5,574,572 | 11/1996 | Malinowski et al. | 358/451 |
| 5,781,241 | * 7/1998 | Donovan | 348/441 |
| 5,861,864 | * 1/1999 | Jensen | 348/445 |
| 5,874,937 | * 2/1999 | Kesatoshi | 345/127 |
| 5,914,753 | * 6/1999 | Donovan | 348/441 |
| 5,917,549 | * 6/1999 | Simons et al. | 348/441 |
| 5,943,097 | * 8/1999 | Horii | 348/441 |
| 5,982,443 | * 11/1999 | Chung | 348/441 |
| 6,069,664 | * 5/2000 | Zhu et al. | 348/448 |
| 6,091,426 | * 7/2000 | Hauck et al. | 345/439 |
| 6,108,047 | * 8/2000 | Chen | 348/448 |
| 6,118,486 | * 9/2000 | Reitmeier | 348/441 |
| 6,144,412 | * 11/2000 | Hirano et al. | 348/441 |

FOREIGN PATENT DOCUMENTS

0837601 * 4/1998 (EP) .

* cited by examiner

Primary Examiner—Reinhard J. Eisenzopf
Assistant Examiner—Brian Yenke
(74) Attorney, Agent, or Firm—Blakely, Sokoloff, Taylor & Zafman LLP

(57) ABSTRACT

The present invention is a method and apparatus for converting scan rates of image data in a memory. A buffer stores a source image data. A scaling filter is coupled to the buffer to scale the source image data.

21 Claims, 30 Drawing Sheets

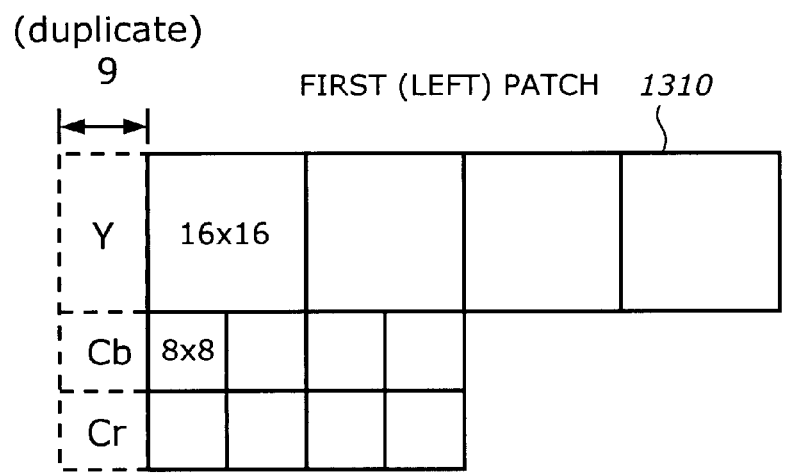
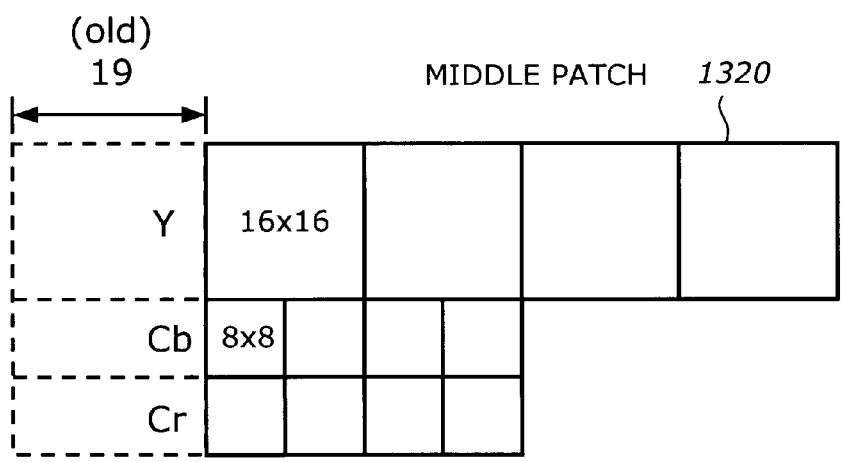
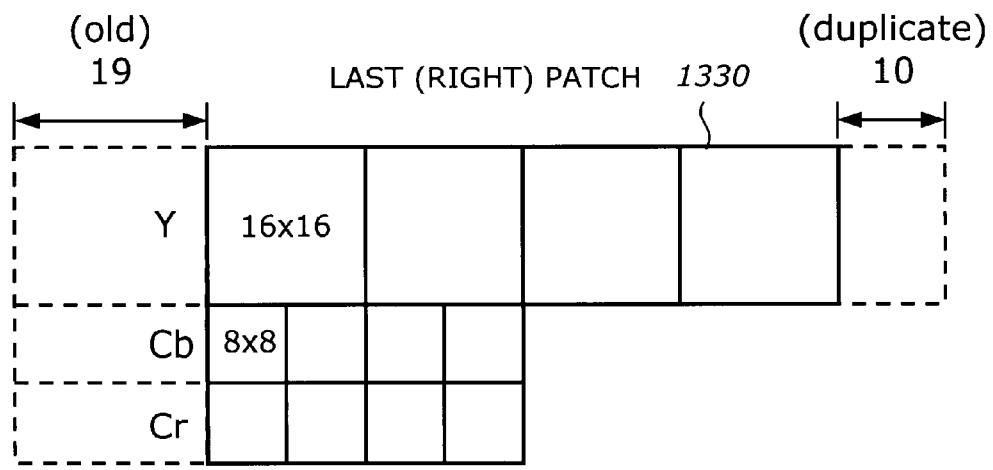
FIG. 13B

| DISPLAY FORMAT | DESTINATION HIGH RESOLUTION PROGRESSIVE | DESTINATION HIGH RESOLUTION INTERLACED |
|---|---|---|
| SOURCE LOW RESOLUTION PROGRESSIVE | (1) US READS A *FRAME* IN MEMORY AND UP-SCALES THE IMAGE TO A *FRAME* IMAGE<br>(2) DISPLAY THE RESULTING *FRAME* IMAGE | (1) US READS FROM A *FRAME* IN MEMORY<br>(2) US UP-SCALES THE *FRAME* IMAGE TO *FIELD* IMAGE<br>(3) DISPLAY THE RESULTING *FIELD* IMAGE |
| SOURCE LOW RESOLUTION INTERLACED | (1) VP READS FROM TWO *FIELDS* IN MEMORY AND DE-INTERLACES TO FORM ONE *FRAME* IMAGE<br>VP WRITES THE RESULTING IMAGE TO MEMORY<br>(2) US READS THE RESULTING *FRAME* FROM MEMORY AND UP-SCALES TO A HIGH RESOLUTION *FRAME*<br>(3) DISPLAY THE RESULTING *FRAME* IMAGE | (1) VP READS FROM TWO *FIELDS* IN MEMORY AND DE-INTERLACES TO FORM ONE *FRAME* IMAGE<br>VP WRITES THE RESULTING IMAGE TO MEMORY<br>(2) US READS THE RESULTING *FRAME* FROM MEMORY AND UP-CONVERTS IT TO A HIGH RESOLUTION FIELD IMAGE<br>(3) DISPLAY THE RESULTING *FRAME* IMAGE |
| SOURCE HIGH RESOLUTION PROGRESSIVE | (1) US READS A *FRAME* FROM MEMORY<br>(2) DISPLAY THE RESULTING *FRAME* IMAGE | (1) US READS A *FRAME* FROM MEMORY AND CONVERTS IT TO A HIGH RESOLUTION *FIELD* IMAGE<br>(2) DISPLAY THE RESULTING *FIELD* IMAGE |
| SOURCE HIGH RESOLUTION INTERLACED | (1) US READS *FIELD* FROM MEMORY AND CONVERTS IT TO A HIGH RESOLUTION *FRAME* IMAGE<br>(2) DISPLAY THE RESULTING *FRAME* IMAGE | (1) US READS A *FIELD* FROM MEMORY<br>(2) DISPLAY THE *FIELD* IMAGE |

US = UPSCALING UNIT
HP = HORIZONTAL PROCESSOR
VP = VERTICAL PROCESSOR

FIG. 15A

| DISPLAY FORMAT | DESTINATION LOW RESOLUTION PROGRESSIVE | DESTINATION LOW RESOLUTION INTERLACED |
|---|---|---|
| SOURCE LOW RESOLUTION PROGRESSIVE | (1) US READS A *FRAME* IN MEMORY<br>(2) DISPLAY THE *FRAME* IMAGE | (1) VP READS A *FRAME* IN MEMORY AND VERTICALLY DOWN-SCALES THE IMAGE TO FORM ONE *FIELD*. RESULTING *FIELD* IS WRITTEN TO MEMORY<br>(2) US READS THE RESULTING *FIELD* IN MEMORY<br>(3) DISPLAY THE *FIELD* IMAGE |
| SOURCE LOW RESOLUTION INTERLACED | (1) VP READS FROM TWO *FIELDS* IN MEMORY<br>(2) VP DE-INTERLACES TWO *FIELDS* TO FORM ONE *FRAME* IMAGE. VP WRITES THE RESULTING *FRAME* TO MEMORY<br>(3) US READS THE RESULTING *FRAME* FROM MEMORY<br>(4) DISPLAY THE *FRAME* IMAGE | (1) US READS FROM EACH *FIELD*<br>(2) DISPLAY THE *FIELD* IMAGE |
| SOURCE HIGH RESOLUTION PROGRESSIVE | (1) HP HORIZONTALLY DOWN-SCALES A *FRAME* IMAGE AND WRITES THE RESULTING IMAGE TO MEMORY<br>(2) VP READS THE *FRAME* FROM MEMORY AND VERTICALLY DOWN-SCALES THE IMAGE. RESULTING IMAGE IS WRITTEN TO MEMORY<br>(3) US READS THE RESULTING *FRAME* FROM MEMORY<br>(4) DISPLAY THE *FRAME* IMAGE | (1) HP HORIZONTALLY DOWN-SCALES A *FRAME* IMAGE AND WRITES THE RESULTING IMAGE TO MEMORY<br>(2) VP READS THE *FRAME* FROM MEMORY AND VERTICALLY DOWN-SCALES TO FORM A *FIELD* IMAGE. RESULTING IMAGE IS WRITTEN TO MEMORY<br>(3) US READS THE RESULTING *FIELD* FROM MEMORY<br>(4) DISPLAY THE *FRAME* IMAGE |
| SOURCE HIGH RESOLUTION INTERLACED | (1) HP HORIZONTALLY DOWN-SCALES A *FRAME* IMAGE AND WRITES THE RESULTING IMAGE TO MEMORY<br>(2) VP READS THE *FRAME* FROM MEMORY AND VERTICALLY DOWN-SCALES THE IMAGE. RESULTING IMAGE IS WRITTEN TO MEMORY<br>(3) US READS THE RESULTING *FRAME* FROM MEMORY<br>(4) DISPLAY THE *FRAME* IMAGE | (1) HP HORIZONTALLY DOWN-SCALES A *FRAME* IMAGE AND WRITES THE RESULTING IMAGE TO MEMORY<br>(2) VP READS THE *FRAME* FROM MEMORY AND VERTICALLY DOWN-SCALES THE IMAGE. RESULTING IMAGE IS WRITTEN TO MEMORY<br>(3) US READS THE RESULTING *FRAME* FROM MEMORY<br>(4) DISPLAY THE *FRAME* IMAGE |

US = UPSCALING UNIT    HP = HORIZONTAL PROCESSOR    VP = VERTICAL PROCESSOR

*FIG. 15B*

EFFICIENT IMAGE SCALING FOR SCAN RATE CONVERSION

BACKGROUND

1. Field of the Invention

This invention relates to video processing.

2. Description of Related Art

Graphics and video systems are now being used in various platforms that are beyond the traditional applications. There is a growing need for the integration of computer-generated graphics and real-time video images in applications ranging from personal computers (PC), video conferences, to television (TV) set-top boxes. Demands for these high performance graphics and video processing systems have created many design challenges.

In a typical high performance graphics and video systems, there may be different display systems with different display formats. These different display formats may create many incompatibility problems. These problems are even more significant with the availability of various high definition television (HDTV) formats or standards. Examples of the HDTV formats include 720P (progressive), 1080I (interlaced), etc. Equipment designed for one format may not be able to function properly when displaying the image in another format.

In addition, the need to provide multiple displays on the same screen such as picture in picture (PIP) applications also creates problems in scaling the video image and/or graphics. If an image is not properly scaled to fit in a display screen, image distortion or loss of information may result. The problem is even more significant when images come from sources with different scanning rates. Furthermore, image objects may need to be manipulated such as overlapping, animation. These object manipulations require a flexible object compositing technique that is economical and efficient in terms of memory requirements and processing time.

When the amount of image data is large, especially for high resolution display, memory access becomes a bottleneck. The use of high speed static random access memories for storing entire image sequences is prohibitively costly. Furthermore, to accommodate real-time processing rate, traditional techniques rely on a massive amount of logic and processing elements, resulting in high complexity, high power consumption, and reduced reliability.

Therefore there is a need in the technology to provide an efficient and versatile technique for performing scan rate conversion, scaling and format conversion, de-interlacing, and image object compositing.

SUMMARY

The present invention is a method and apparatus for converting scan rates of image data in a memory. A buffer stores a source image data. A scaling filter is coupled to the buffer to scale the source image data.

The scaling filter includes a horizontal up-scaling filter, a vertical up-scaling filter, a horizontal down-scaling filter, and a vertical down-scaling filter.

BRIEF DESCRIPTION OF THE DRAWINGS

The features and advantages of the present invention will become apparent from the following detailed description of the present invention in which:

FIG. 13B is a diagram illustrating a patch configuration according to one embodiment of the invention.

FIG. 15A is a table illustrating format conversion to high resolution displays according to one embodiment of the invention.

FIG. 15B is a table illustrating format conversion to low resolution displays according to one embodiment of the invention.

DESCRIPTION

The present invention is a method and apparatus for scaling image data and performing format conversion. Image scaling is achieved by horizontal and vertical filtering. Horizontal and vertical down-scaling filters with on-chip buffers operate on patches of image data to achieve high speed and results in efficient memory usage. Format conversion is performed by a series of steps using image scaling, interlacing, and de-interlacing to accommodate multiple display formats at various display resolutions.

In the following description, for purposes of explanation, numerous details are set forth in order to provide a thorough understanding of the present invention. However, it will be apparent to one skilled in the art that these specific details are not required in order to practice the present invention. In other instances, well known electrical structures and circuits are shown in block diagram form in order not to obscure the present invention.

Figure 1:
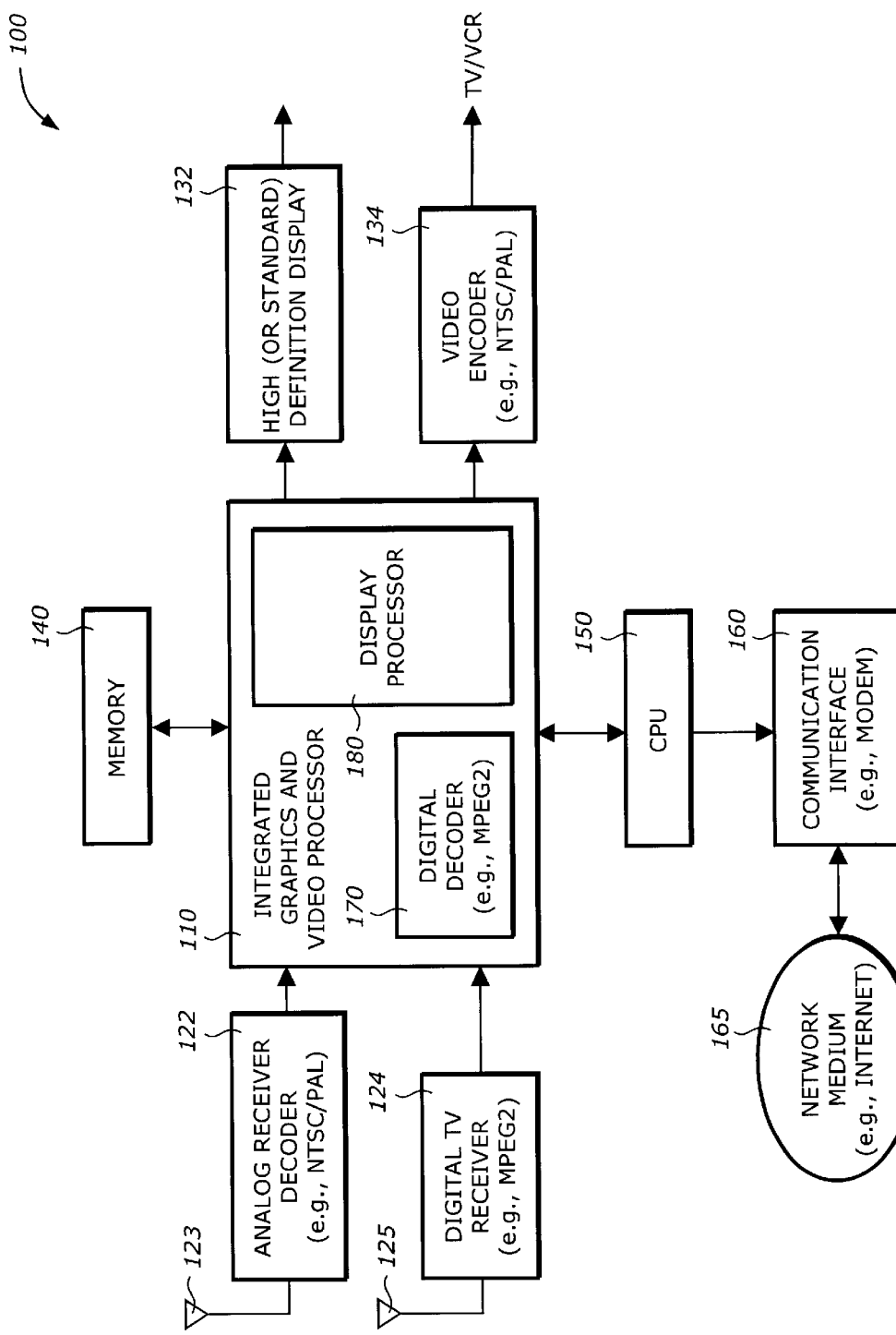
FIG. 1 is a diagram illustrating a system in which one embodiment of the invention can be practiced.

FIG. 1 is a diagram illustrating a video and graphics system 100 in which one embodiment of the invention can be practiced. The system 100 includes an integrated graphics and video processor 110, an analog receiver decoder 122, a digital television (TV) receiver 124, a high (or standard) definition display monitor, a video encoder 134, a memory 140, and a central processing unit (CPU) 150. Additional elements include a communication interface 160, and a network medium 165.

The integrated graphics and video processor 110 is a high performance processor dedicated for graphics and video processing. It can be used in a number of applications including set-top boxes and other television (TV)-based digital systems. The integrated graphics and video processor 110 includes a digital decoder 170 and a display processor 180. The digital decoder 170 receives digital multimedia data from standards such as Moving Picture Expert Group (MPEG) standard MPEG-2. The digital decoder 170 passes the decoded data to the display processor 180 and/or other units for further processing or storage. The display processor 180 processes the video and/or graphic data and generate the result to the high (or standard) definition display monitor 132 and video encoder 134.

The analog receiver decoder 122 receives analog signal via the antenna 123 and processes analog video signals and presents digital data to the integrated graphics and video processor 110 in proper formats. The analog decoder 122 captures and digitizes the analog video signals into digital data. In one embodiment, the analog video signal is an NTSC or PAL signal, and the decoded digital data format is YCbCr 4:2:2 digital video. As is known by one skilled in the art, other types of analog video signals and digital data formats can be used.

The digital TV receiver 124 receives digital data via the antenna 125 and processes the digital data and decodes the data into appropriate channels and formats to the integrated graphics and video processor 110. In one embodiment, the digital data follow the Moving Picture Expert Group (MPEG) standards. Examples of the MPEG standards include MPEG-2, MPEG-4, and MPEG-7. The digital data may include multimedia information such as moving picture and stereo audio.

The high (or standard) definition display monitor 132 is a display monitor that can display images/video/graphics information at high resolution or low resolution at various scanning modes such as interlaced or progressive (non-interlaced) scanning mode. The video encoder 134 is a device or an equipment that converts the digital output from the integrated graphics and video processor 110 into appropriate video signals. In one embodiment, the video encoder 132 provides input to a TV set and/or a video cassette recorder (VCR). As is known by one skilled in the art, other video equipment can be used.

The memory 140 stores code, data, and other information for use by the integrated graphics and video processor 110 and other devices. In one embodiment, the memory 140 includes a number of synchronous dynamic random access memory (SDRAM) devices.

The CPU 150 is a processor that performs general processing functions. The integrated graphics and video processor 110 is designed to interface with a number of microprocessors. In one embodiment, these microprocessors include the Motorola MC6833x, the Motorola MC68340/L64x08, the ST20-TPI/ST20-T, the Motorola MCF5206, the Hitachi SH-2/3, and the DEC StrongARM SA-110. As is known by one skilled in the art, other microprocessors can be used including digital signal processors (DSP), reduced instruction set computers (RISCs), or even special-purpose processors.

The communication interface 160 provides interface to communication devices or media to the CPU 150. The communication interface 160 may include telephone modem interface, network interface, radio transceivers, fiber optics transceivers, etc. The network medium 165 provides a communication medium for information transmission and reception. In one embodiment, the network medium 165 is the Internet.

Figure 2:
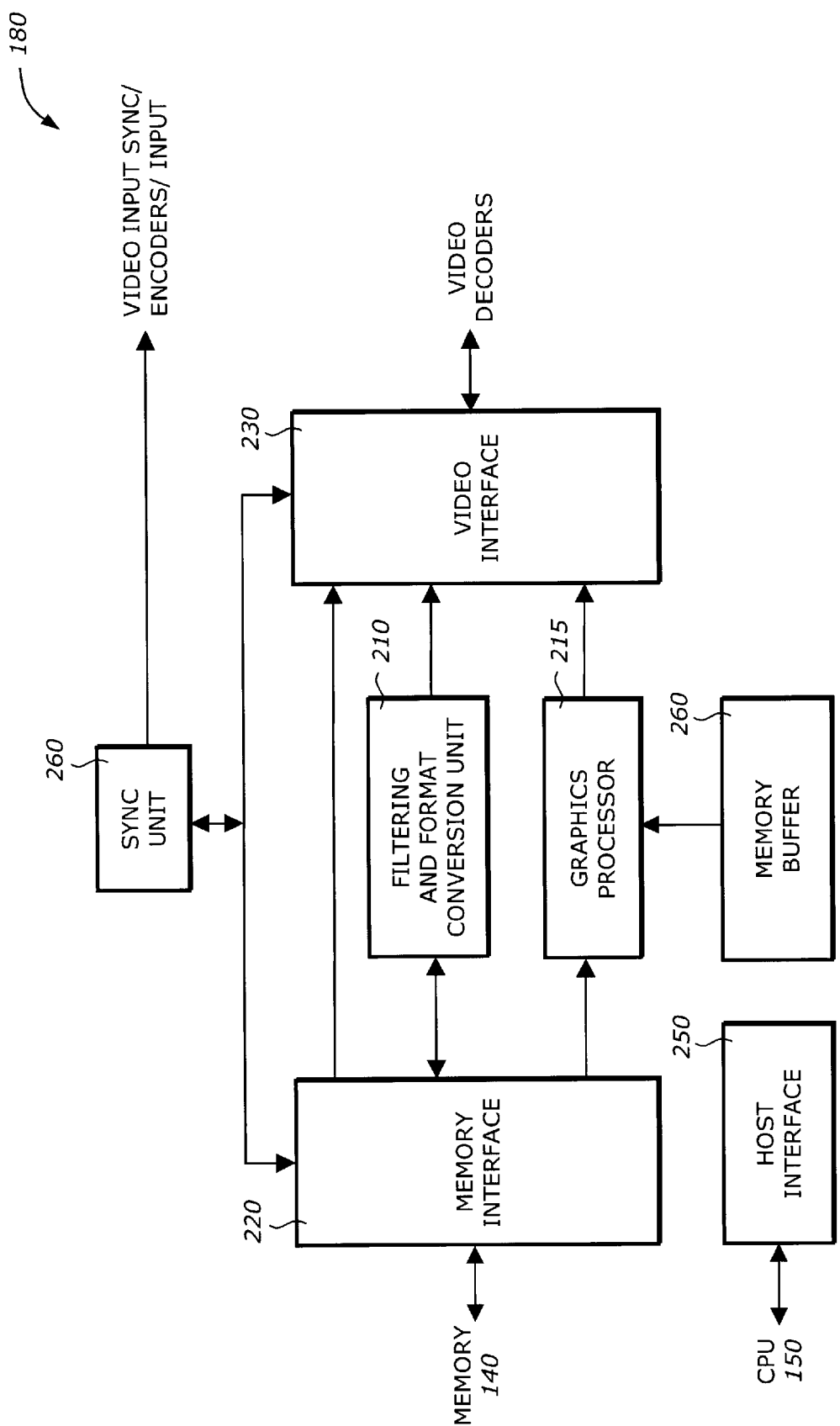
FIG. 2 is a diagram illustrating a according to one embodiment of the invention.

FIG. 2 is a diagram illustrating a display processor 180 shown in FIG. 1 according to one embodiment of the invention. The display processor 180 includes a filtering and format conversion unit (FFCU) 210, a graphics processor 215, a memory interface 220, a video interface 230, a memory buffer 240, a host interface 250, and a synchronization (SYNC) circuit 260.

The FFCU 210 receives the graphic/video data from the memory 140 via the memory interface 220 and the memory buffer 240 and generates the result to the video encoders via the video interface 230. FFCU 210 performs a comprehensive set of functions on two-dimensional pixel data in a variety of pixel map formats. These functions include horizontal and vertical scaling and filtering. The FFCU also is used to convert various source display formats to destination display formats. The graphics processor 215 performs additional graphics and image operations such as aspect ratio correction, and anti-flickering.

The memory interface 220 interfaces to the memory 140 (FIG. 1) to provide data to the FFCU 210, the graphics processor 215 and the video interface 230. The memory interface 220 includes circuits to allow access to the memory 140 at high bandwidth to accommodate the processing speed of the graphics processor 210.

The video interface 230 performs the final blending and composing operations of the input sources of the display processor 180. The video interface 230 also generates proper video timing signals to video encoders such as CCIR-601 synchronization, vertical and horizontal synchronization signals. The video interface 230 generates display data to the video encoders and receives background (BGND) video from other video sources.

The memory buffer 240 stores temporary data in properly sized buffers for use by the CPU 150 and the graphics processor 210. The memory buffer 240 manages the buffer needs of the background graphics, scaled video, scaled graphics, cursor and configuration registers. In one embodiment, these buffers are implemented by fast static random access memory (SRAM).

The host interface 250 provides interface to the CPU 150. The host interface 250 generates interrupt signals to the CPU 150 for end of scan line, beginning of field, or end of field. The host interface 250 also allows the CPU 150 to configure and initialize the display processor 180 via a set of configuration and control registers.

The SYNC unit 260 provides horizontal (H), vertical (V), and field (F) information to be used in video synchronization. The H, V, and F information can be generated in a programmable manner so that a number of video formats can be accommodate. Examples of these video formats include CCIR-601, NTSC, PAL.

Figure 3:
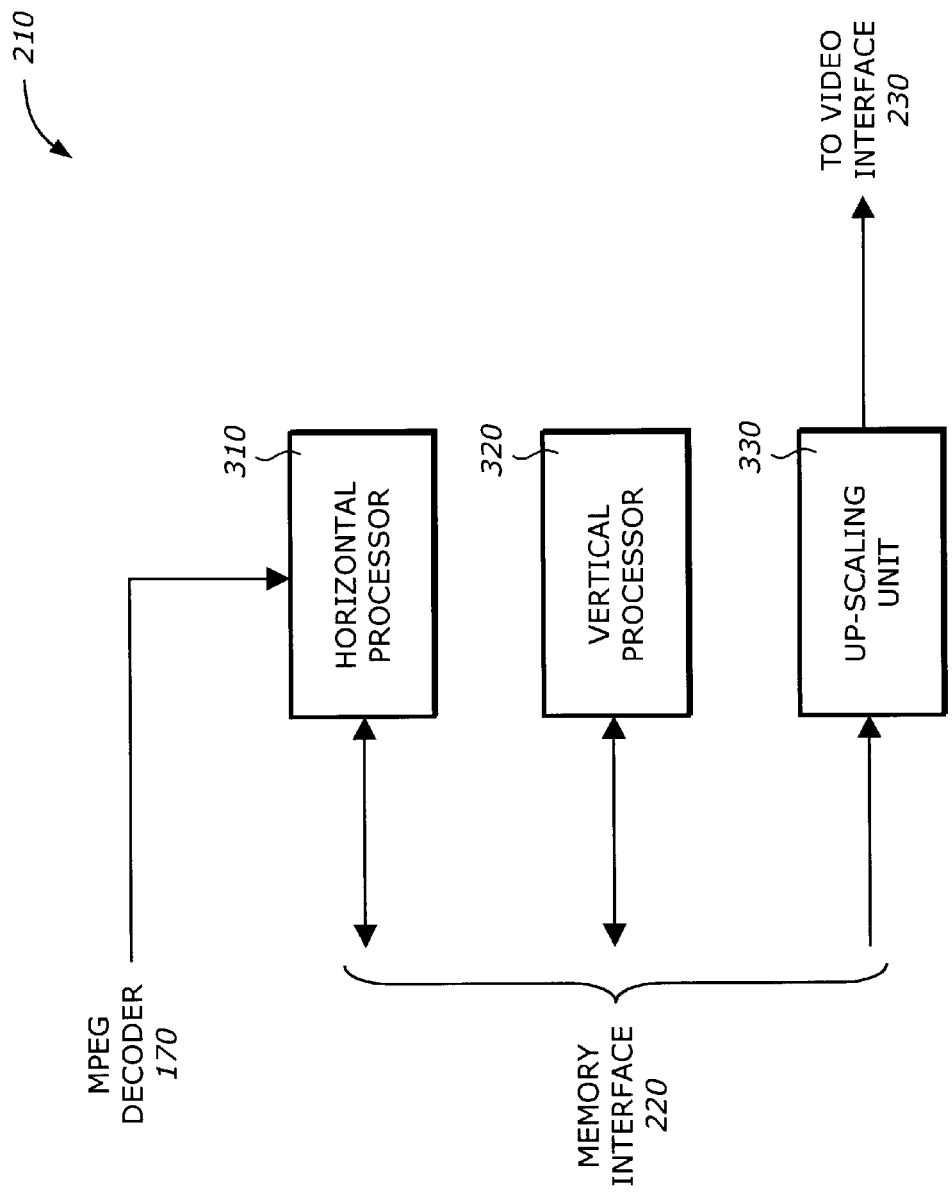
FIG. 3 is a diagram illustrating a filtering and format conversion unit (FFCU) according to one embodiment of the invention.

FIG. 3 is a diagram illustrating a filtering and format conversion unit (FFCU) 210 according to one embodiment of the invention. The FFCU 210 includes a horizontal processor (HP) 310, a vertical processor (VP) 320, and a up-conversion unit 330.

The HP 310, the VP 320, and the up-conversion unit 330 all interface to the memory interface 220 (FIG. 2). The up-conversion unit generates output to the video interface 230 (FIG. 2).

The HP 310 receives image data from MPEG decoder 170 either directly or from the memory 140 via the memory interface 220. In one embodiment, the HP 310 receives the image data directly from the MPEG decoder 170 (shown in FIG. 1). The HP 310 processes the image data horizontally. The processed image data are the written back to the memory 140 to be processed by the subsequent stage.

The VP 320 obtains image data from the memory 140 and processes the image data vertically. To achieve efficiency, the VP 320 processes image data in vertical patches. The vertical patches are fetched from the memory 140 and stored in a buffer inside the VP 320. Since the vertical processing is performed on the on-chip buffers, the processing rate is fast to achieve high quality filtering results. The VP 320 writes the result back to the memory 140 for subsequent processing.

The up-scaling unit 330 performs up-scale operations when required. The up-scaling unit 330 can also bypass the up-scale processing. The result is then passed to the video interface 230 for display.

Figure 4:
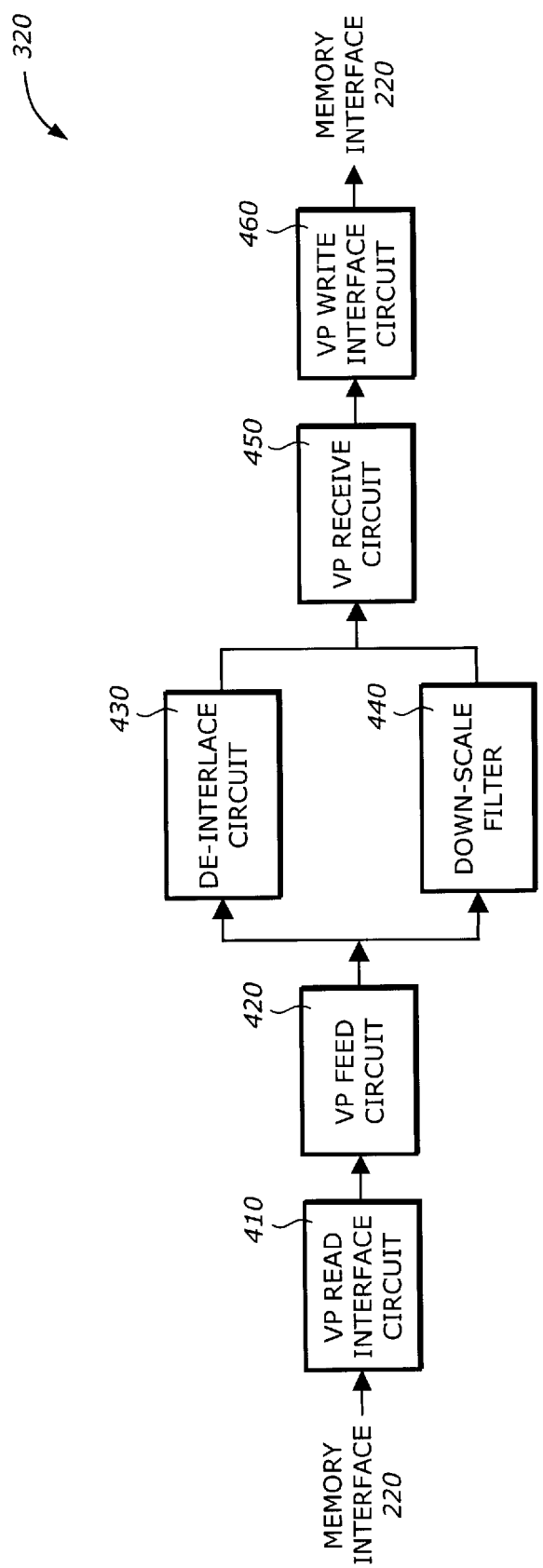
FIG. 4 is a diagram illustrating a vertical processor (VP) shown in FIG. 3 according to one embodiment of the invention.

FIG. 4 is a diagram illustrating a vertical processor (VP) 320 shown in FIG. 3 according to one embodiment of the invention. The VP 320 includes a VP read interface circuit 410, a VP feed circuit 420, a de-interlace circuit 430, a down-scale VP filter 440, a VP receive circuit 450, and a VP write interface circuit 460.

The VP read interface circuit 410 interfaces to the memory interface 220 to read image data from the memory 140. The VP read interface circuit 410 re-organizes the image data to be ready for vertical processing. The VP feed circuit 420 mainly converts the parallel loaded data into a sequential series of pixels to facilitate processing. The de-interlace circuit 430 performs de-interlace operations when converting the image format from interlace to progressive formats. The down-scale VP filter 440 performs the down-scale operation on the image data. In one embodiment, the de-interlace circuit 430 and the down-scale VP filter 440 operate in two separate data paths in a mutual exclusive manner. As is known by one skilled in the art, the configuration may be modified to allow both circuits to operate in parallel to achieve both results at the same time if necessary.

The VP receive circuit 450 selects and organizes results from the de-interlace circuit 430 and the down-scale VP filter 440. The VP write interface circuit 460 stores the selected results in a buffer, re-organizes the processed image data and writes the final result back to the memory interface 220.

Figure 5A:
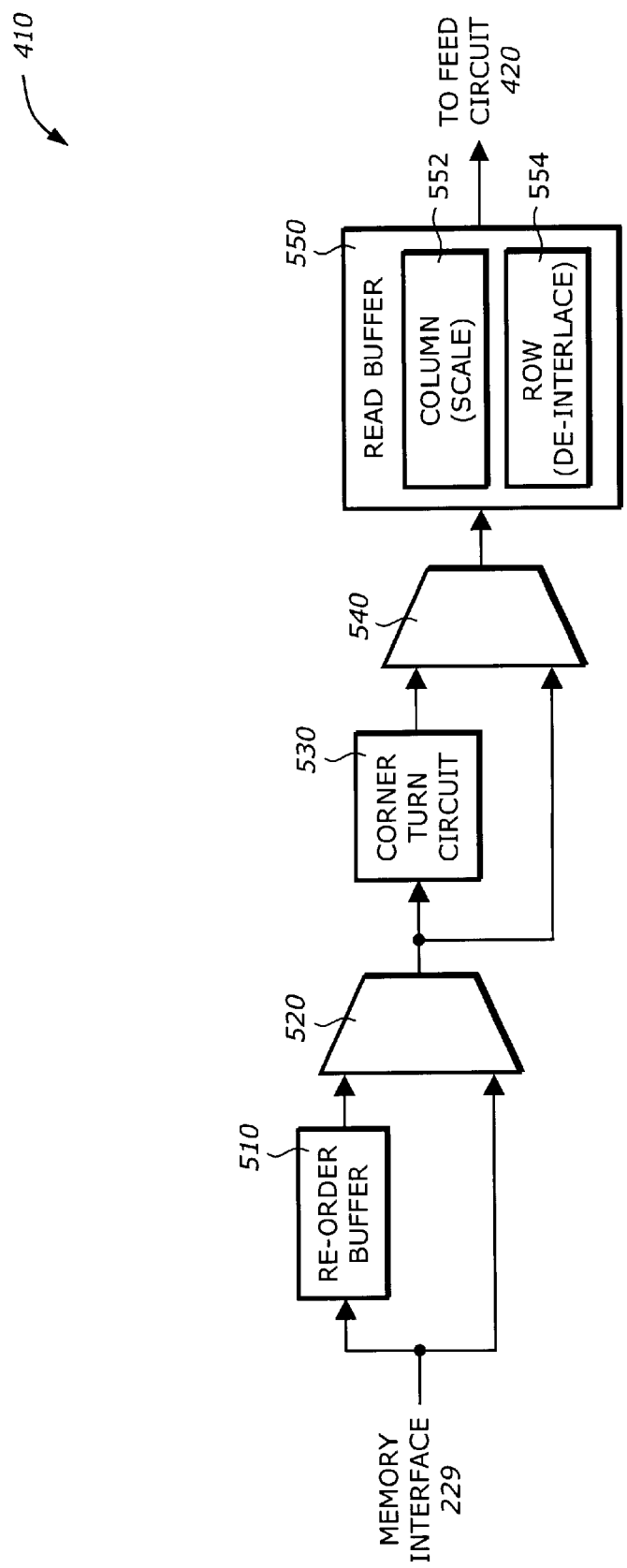
FIG. 5A is a diagram illustrating a VP read interface circuit shown in FIG. 4 according to one embodiment of the invention.

FIG. 5A is a diagram illustrating a VP read interface circuit 410 shown in FIG. 4 according to one embodiment of the invention. The VP read interface circuit 410 includes a re-order buffer 510, a multiplexer 520, a corner turn circuit 530, a multiplexer 540, and a read buffer 550. The VP read interface circuit 410 provides support for processing either interlaced images or progressive images.

The VP read interface circuit 410 reads the image data from the memory 140 via the memory interface 220. The read image data can be reordered by the re-order buffer 510 or bypassed around the re-order buffer 510. The re-order buffer 510 merges the field separated data of progressive frames from the memory 140 into correct line order. The multiplexer 520 allows selection of the re-ordered image data or the original image data from the memory 140. The corner turn circuit 530 transposes the rows of pixels into columns of pixels for vertical processing. The multiplexer 540 allows selecting between the transposed data or the selected data from the multiplexer 520. The read buffer 550 stores the image data in column format (for down-scale filtering) in a column buffer 552 or row format (for de-interlacing) in a row buffer 554.

Figure 5B:
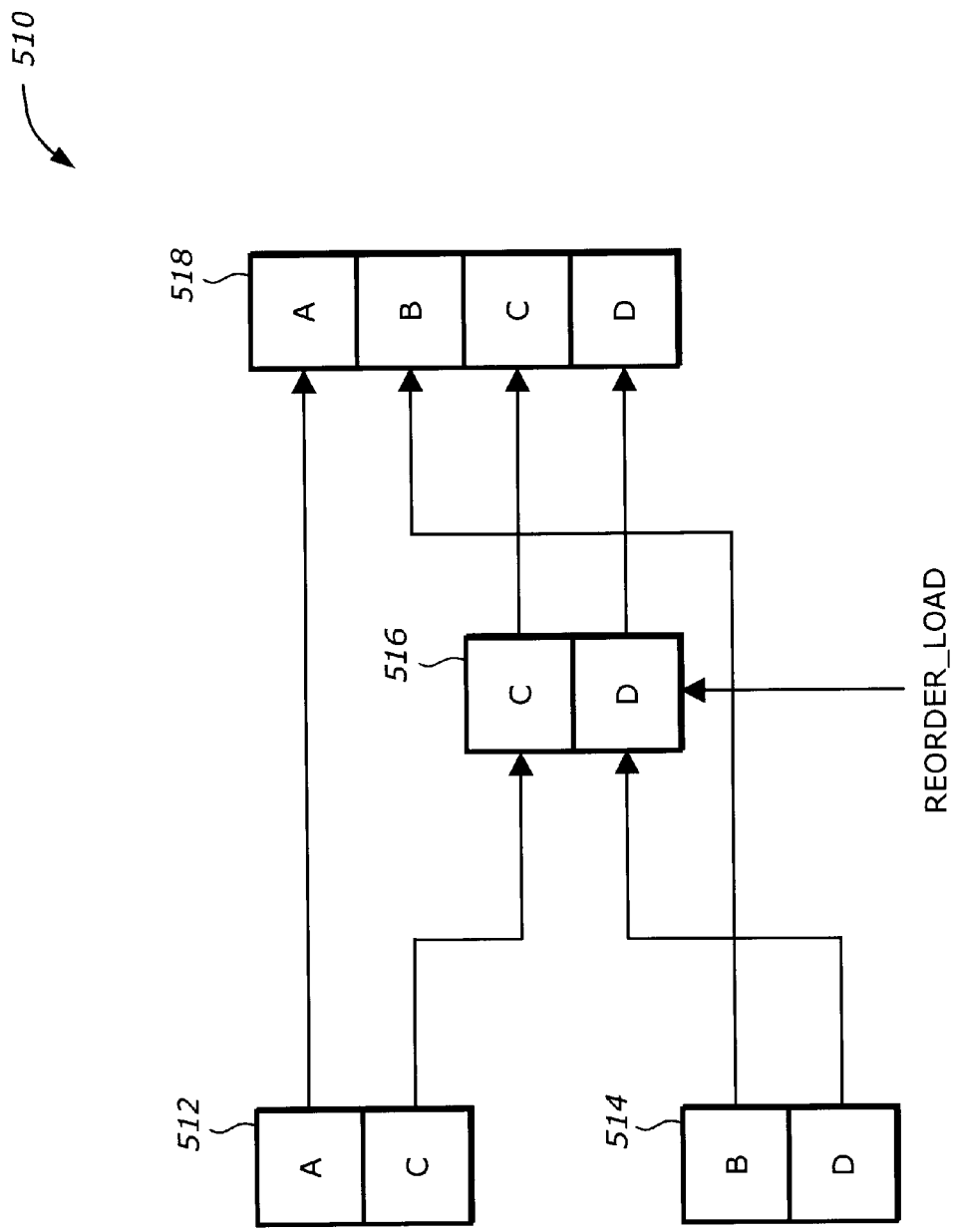
FIG. 5B is a diagram illustrating a re-order buffer shown in FIG. 5A according to one embodiment of the invention.

FIG. 5B is a diagram illustrating a re-order buffer 510 shown in FIG. 5A according to one embodiment of the invention. The re-order buffer 510 includes line buffers 512, 514, 516, and 518.

The memory 140 stores image data in two fields: an even field corresponding to even lines, and an odd field corresponding to odd lines. The two fields are stored in two areas in the memory 140. When processing an interlaced image, all lines of data in a field come from the same area of the memory 140. When processing a frame from a progressive image, each subsequent line comes alternatively from each of the two areas of the memory 140.

The image data are transferred two eight byte words in contiguous cycles per transaction. When processing a progressive image, a pair of transactions is initiated, one to each of the two memory controller buffers. Each transaction contains a pair of lines, both being either even line numbers or odd numbers. The line buffers 512 and 514 stores two even lines (A,C) and two odd lines (B,D), respectively. The line buffer 516 is essentially a register to load the alternating lines C and D. The line buffer 518 stores the re-ordered data A, B, C, and D. In this manner, the re-order buffer 510 accepts eight interlaced lines from the memory 140 and re-orders the lines in a non-interlaced manner to send to the corner turn in each pass.

Figure 5C:
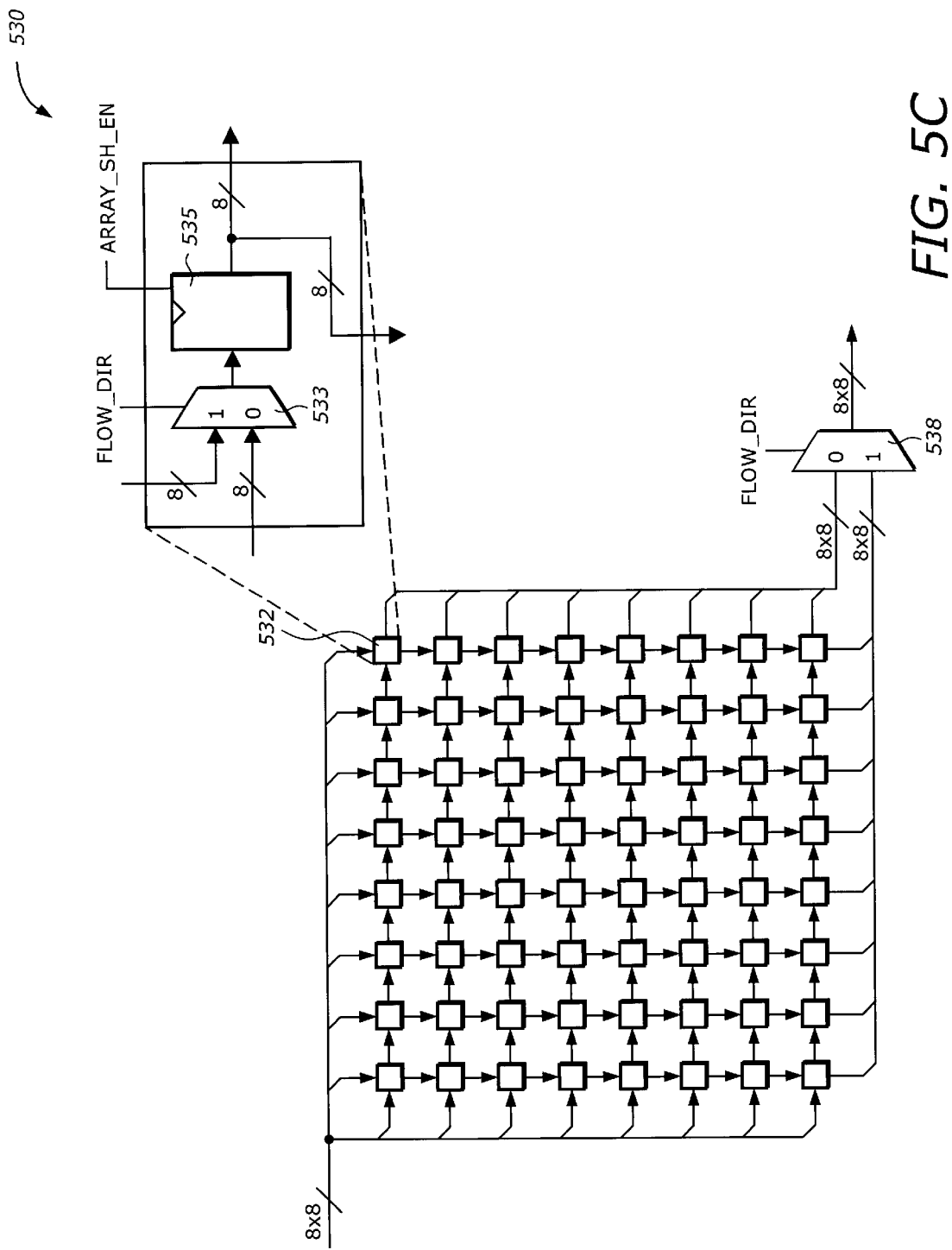
FIG. 5C is a diagram illustrating a corner turn circuit shown in FIG. 5A according to one embodiment of the invention.

FIG. 5C is a diagram illustrating a corner turn circuit 530 shown in FIG. 5A according to one embodiment of the invention. The corner turn 530 includes an eight-by-eight array of register units to perform a two-dimensional data steering logic function, and a multiplexer 538.

The 8×8 register units form a two-dimensional array of 8×8, where each element corresponds to an 8-bit pixel. Eight words (eight pixels per word) are shifted into the array one word at a time. Once the array has been loaded, the resultant data are shifted out to the right one word at a time to generate the column elements. The array also supports row transferred data. The multiplexer 538 selects between the row and column data.

The 8×8 array includes 64 identical elements, represented by an element 532. The element 532 includes a multiplexer 533 and a register 535. The multiplexer 533 allows selecting data from the left or from above as shown in the 2-D array. The output of the register is directed to the element to the right and below. The register 535 is enabled for shifting by an array shift enable (ARRAY_SH_EN) control signal. The control signal for the multiplexer 533 and 538 is a flow direction (FLOW_DIR) control signal that controls the selection of row or column data.

Figure 6:
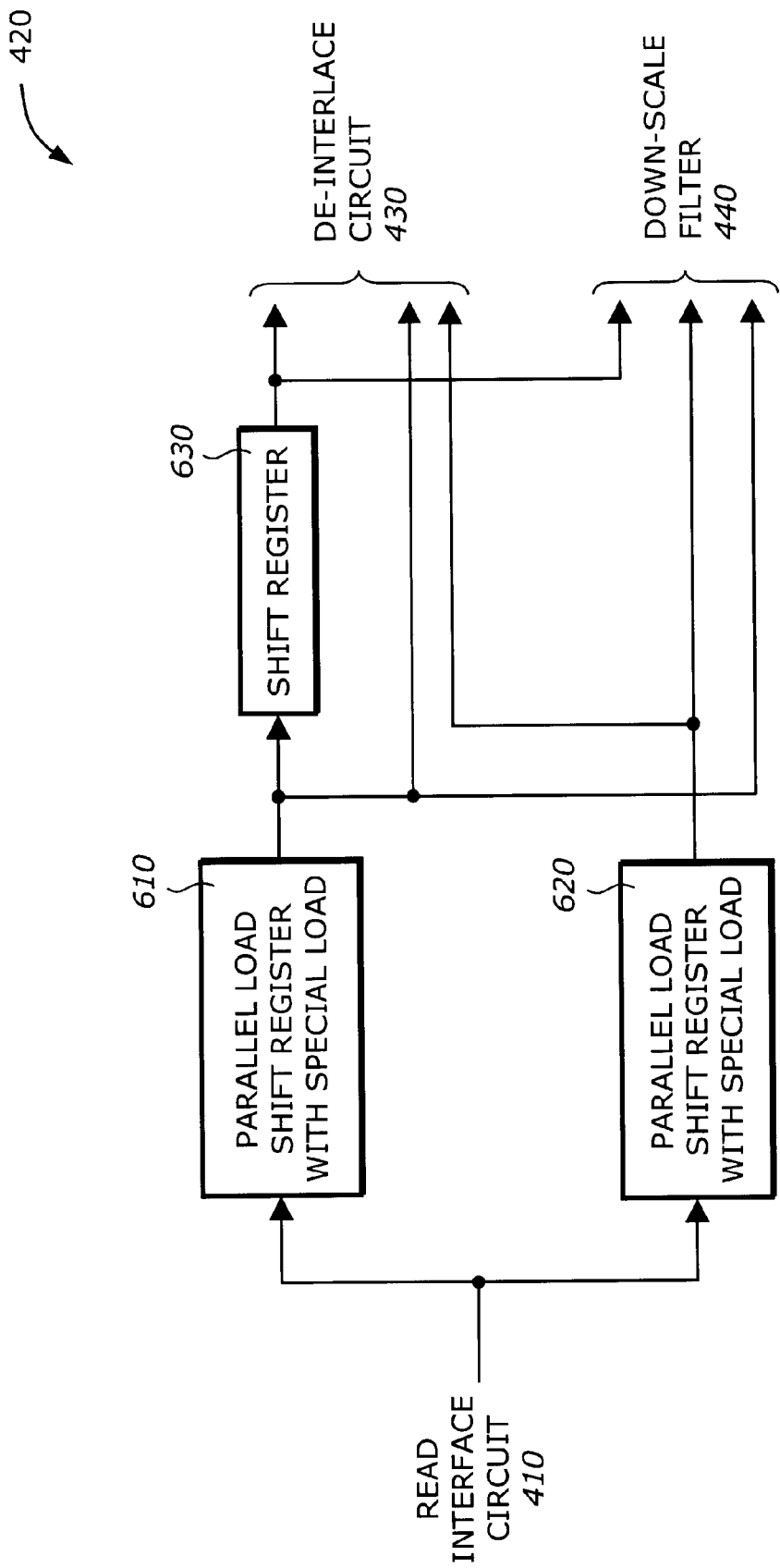
FIG. 6 is a diagram illustrating a VP feed circuit shown in FIG. 4 according to one embodiment of the invention.

FIG. 6 is a diagram illustrating a VP feed circuit 420 shown in FIG. 4 according to one embodiment of the invention. The VP feed circuit 420 includes parallel load shift registers 610 and 620, and a shift register 630. The VP feed circuit 420 essentially performs parallel to serial conversion.

The de-interlace circuit 430 and the down-scale filter 440 expect consecutive pixels (either horizontally or vertically) to be serially fed to their respective inputs. The on-chip buffer 550 (FIG. 5A) in the VP read interface circuit 410 stores multiple adjacent pixels in parallel. The VP feed circuit 420 provides a shifting mechanism to convert the parallel data from the on-chip buffer 550 to serial form for feeding the de-interlace circuit 430 and the down-scale filter 440.

The parallel load shift registers 610 and 620 provide the serial data for the down-scale filter 440. The parallel load shift registers 610, 620 and the shift register 630 provide the serial data for the de-interlace circuit 430.

Each of the parallel load shift registers 610 and 620 loads the pixel data from the VP read interface circuit 410 in parallel and then shifts the loaded data serially. The shift register 630 acts as an additional shifter. The pixel replication necessary for the down scale filter can be accomplished by asserting the valid data signal for the shift register output and de-asserting the shift control signal.

The de-interlace circuit 430 requires three lines to be fed, one pixel from each line in each cycle. The de-interlace circuit 430 traverses a patch horizontally from left to right. After each line has been processed, the de-interlace circuit 430 moves down by two lines. Therefore, the data in the bottom line will repeat as the top line in the next traversal. This is accomplished by shifting the data from the top line into the shift register for the bottom line at the same time as the data is being shifted into the de-interlace circuit 430. As the final pixels in a word are shifted out, new pixels are loaded into the parallel load shift registers 610 and 620 from words read from the VP read interface circuit 410.

In the de-interlace mode, some situations require the VP feed circuit 420 to replicate the data in one line for another line. This is accomplished by first loading the parallel load shift registers 610 and 620, each with a line. A dummy shifting cycle is gone through with no valid data fed into the de-interlace circuit 430 to shift the serial data from the parallel load shift register 610 into the shift register 630. At the same time, the data is re-circulated back into the parallel load shift register 610 to preserve the original data for the line. After this step, the parallel load shift register 610 and the shift register 630 contain the same data and the parallel load shift register 620 contain data from another line.

Figure 7:
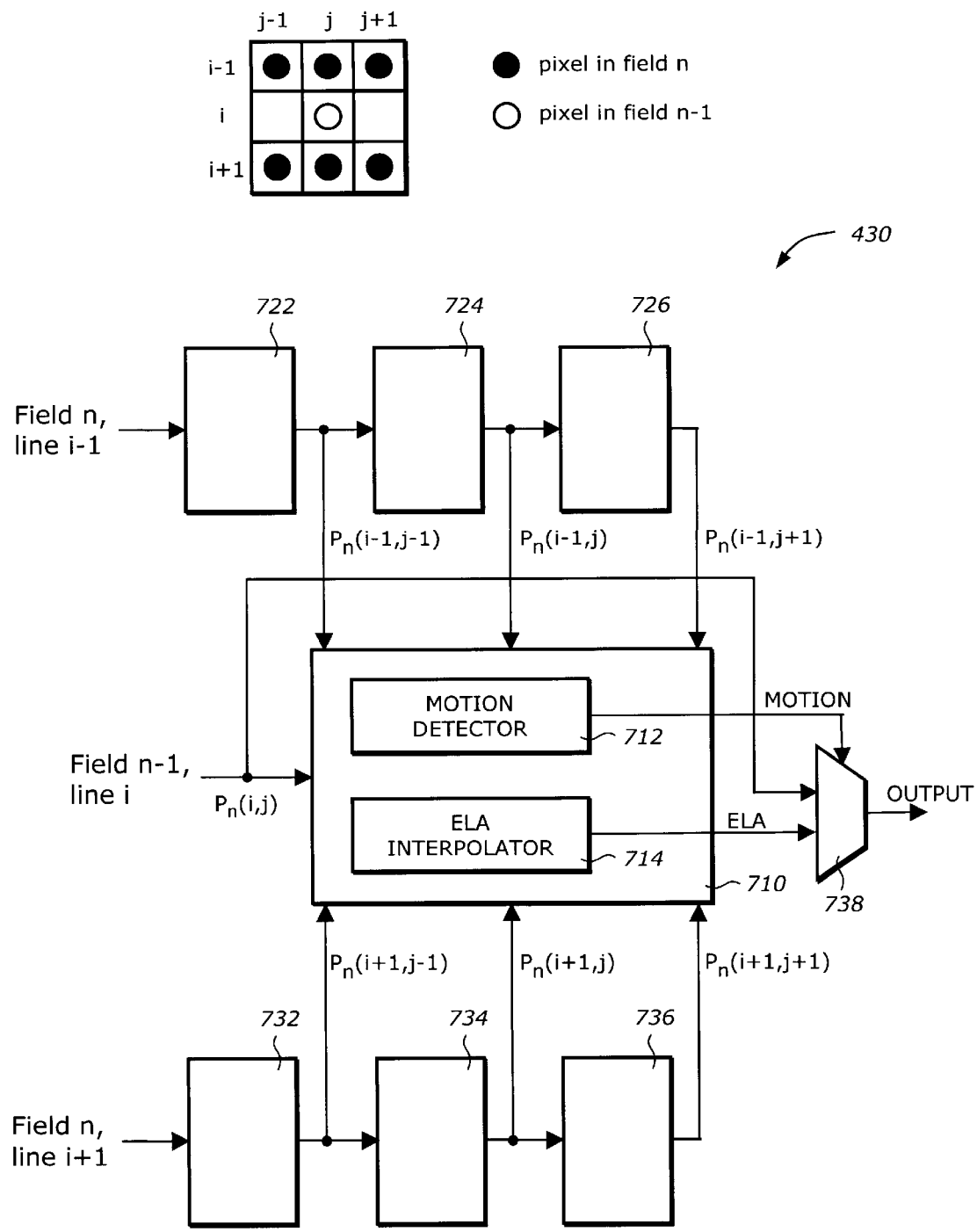
FIG. 7 is a diagram illustrating a de-interlace circuit shown in FIG. 4 according to one embodiment of the invention.

FIG. 7 is a diagram illustrating a de-interlace circuit shown in FIG. 4 according to one embodiment of the invention.

The basic concept of de-interlacing is to convert an interlaced image into a non-interlaced (or progressive) image with the same number of lines in the frame at 60 Hz refresh rate as the number of lines in both fields of the interlaced image at the field refresh rate of 30 Hz. The de-interlacing involves considerations of both spatial and temporal information.

FIG. 7 shows a 3×3 window of pixel data used in the de-interlacing. The pixel data corresponds to two fields n and n−1. The center pixel corresponds to field n−1 while the surrounding pixels correspond to field n. The pixel elements used in the de-interlacing circuit includes $p_n(i-1,j-1)$, $p_n(i-1,j)$, $p_n(i-1,j+1)$, $p_{n-1}(i,j)$, $p_n(i+1, j-1)$, $p_n(i+1,j)$, and $p_n(i+1,j+1)$.

The de-interlacing operation first determines if there is sufficient motion in the pixel data. If there is no significant motion, the de-interlaced pixel is $p_{n-1}(i,j)$. If there is sufficient motion, the de-interlaced pixel is the interpolated pixel.

The pseudocode for the de-interlacing operation is as follows:

Motion detection:

$$A = abs\{[(p_n(i-1,j-1)+p_n(i+1,j+1))/2]-p_{n-1}(i,j)\} \quad (3a)$$

$$B = abs\{[(p_n(i-1,j)+p_n(i+1,j))/2]-p_{n-1}(i,j)\} \quad (3b)$$

$$C = abs\{[(p_n(i+1,j-1)+p_n(i-1,j+1))/2]-p_{n-1}(i,j)\} \quad (3c)$$

$$\text{if } ((A>\text{threshold}) \ \&\& \ (B>\text{threshold}) \ \&\& \ (C>\text{threshold})) \quad (3d)$$

then out=ELA; /* there is motion */
else out=$p_{n-1}(i,j)$ /* no motion*/
Edge based line average (ELA) interpolator:
The pseudocode for computing ELA is:

$$A = p_n(i-1,j-1)-p_n(i+1,j+1) \quad (4a)$$

$$B = p_n(i-1,j)-p_n(i+1,j) \quad (4b)$$

$$C = p_n(i-1,j+1)-p_n(i+1,j-1) \quad (4c)$$

$$\text{If } (A<B) \ \&\& \ (A<C) \ ELA=(p_n(i-1,j-1)+p_n(i+1,j+1))/2 \quad (4d)$$

$$\text{If } (C<A) \ \&\& \ (C<B) \ ELA=(p_n(i-1,j+1)+p_n(i+1,j-1))/2 \quad (4e)$$

$$\text{If } (B<=A) \ \&\& \ (B<=C) \ ELA=(p_n(i-1,j)-p_n(i+1,j))/2 \quad (4f)$$

The de-interlace circuit 430 includes a de-interlace core circuit 710, registers 722, 724, 726, 732, 734, and 736, and multiplexer 738.

The registers 722, 724 and 726 receive the pixel data from line i−1 in field n to provide the pixels $p_n(i-1,j-1)$, $p_n(i-1j)$, and $p_n(i-1,j+1)$, respectively.

The registers 732, 734, and 736 receive the pixel data from line i+1 in field n to provide the pixels $p_n(i+1,j-1)$, $p_n(i+1,j)$, and $p_n(i+1,j+1)$. The de-interlace core circuit 710 receives the pixel $p_{n-1}(i,j)$ from line i and field n−1 and the other six pixel data to generate the motion and interpolation results. The de-interlace core circuit 710 includes a motion detector 712 and an ELA interpolator 714. The multiplexer 738 selects between the pixel $p_{n-1}(i,j)$ and the interpolated result based on the motion detector result.

Figure 8:
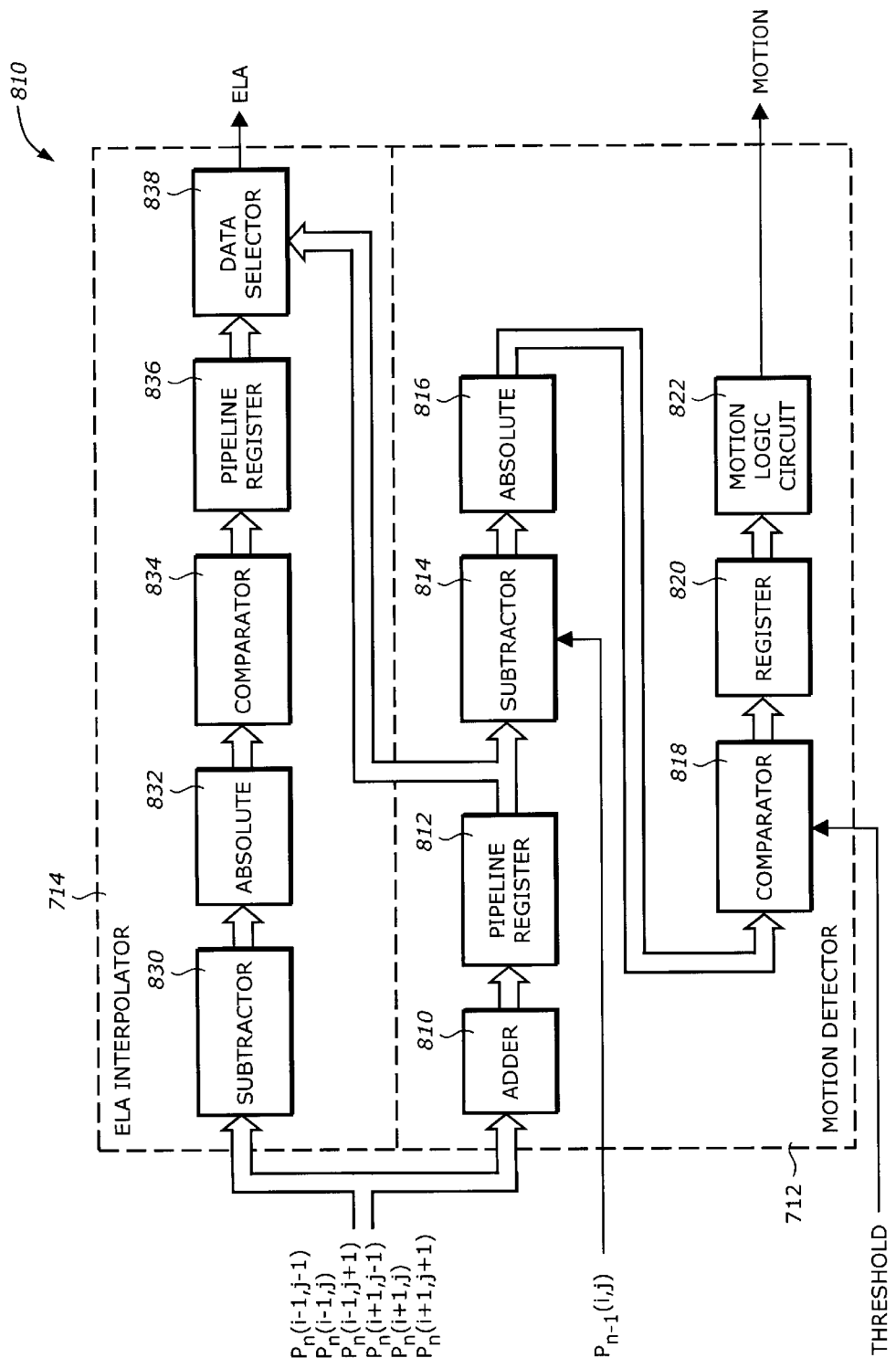
FIG. 8 is a diagram illustrating a de-interlace interpolator circuit shown in FIG. 7 according to one embodiment of the invention.

FIG. 8 is a diagram illustrating a de-interlace core circuit 710 shown in FIG. 7 according to one embodiment of the invention. The de-interlace core circuit 710 includes a motion detector 712 and an interpolator 714.

The motion detector 712 includes an adder array 810, a pipeline register array 812, a subtractor array 814, an absolute array 816, a comparator array 818, a register array 820, and a motion logic circuit 822. The adder array 810 performs the addition inside the abs( ) shown in equations (3a), (3b) and 3(c). The resulting sums are stored in the pipeline register array 812 to synchronize with the interpolator 714. The subtractor array 814 subtracts the pixel data pn(I,j) from each of the sums. The absolute array 816 takes the absolute of the differences to generate the quantities A, B, and C in equations (3a), 3(b) and 3(c). The comparator array 818 compares each of the quantities A, B, and C with the threshold value as shown in the test condition (3d). The results of the comparison are stored in the register array 820. The motion logic circuit 822 combines the comparison results and produce the motion result.

The interpolator 714 includes a subtractor array 830, an absolute array 832, a comparator array 834, a pipeline register array 836, and a data selector 838. The subtractor array 839 and the absolute array 832 perform the operations in equations (4a), (4b), and (4c). The comparator array 834 performs the various comparisons as shown in equations (4d), (4e), and (4f). The pipeline register array 836 stores the result of the comparison. The data selector 838 generates the AELA interpolated value using the comparison results and the sum results from the pipeline register array 812 in the motion detector 712.

Figure 9A:
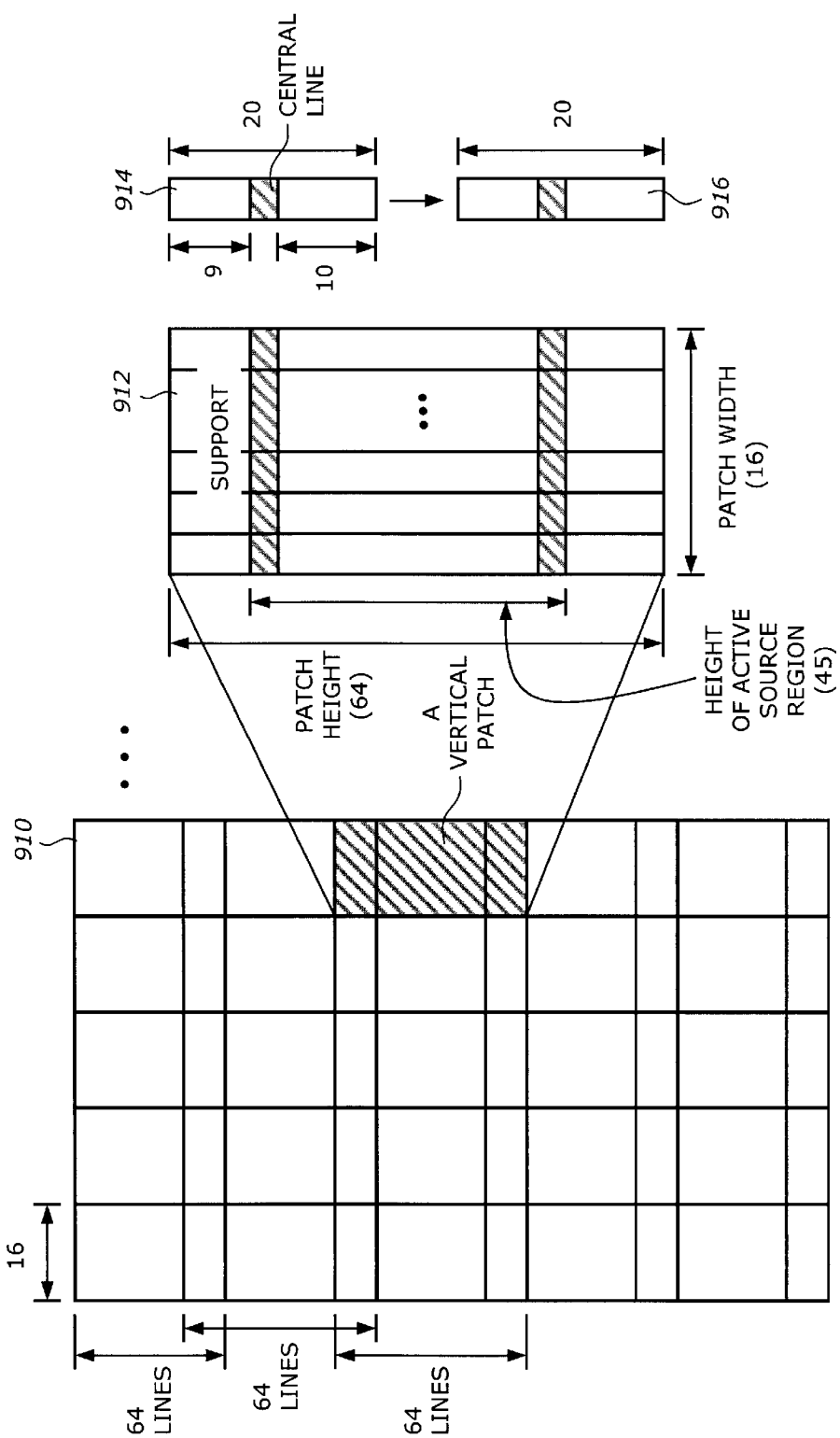
FIG. 9A is a diagram illustrating vertical patch organization according to one embodiment of the invention.

FIG. 9A is a diagram illustrating vertical patch organization according to one embodiment of the invention. The organization includes an image region 910. The image region includes an exemplary vertical patch 912. The image region 910 shows a portion of the image that contains a number of vertical patches.

Patches are rectangular sections, sometimes referred to as tiles, of an image. Patches overlap to provide support for the filters when computing data along the edge of the patch to eliminate edge effects. The region 910 consists of a number of vertical patches that are adjacent on columnwise but are overlapped on rowwise. Each vertical patch is organized as 16×64, i.e., each vertical patch is 16-pixels wide and 64-pixels high. As is known by one skilled in the art, other patch sizes are possible. The choice the patch size depends on factors such as processing overhead, memory access times, filter size, etc. and is selected to optimize the overall performance. The height of a vertical patch may be less than 64 when it is at the bottom edge of the image or after the patch has been scaled down vertically. A vertical patch consists of an active source region being processed vertically plus additional lines for the filter support. The actual number of lines processed is equal to patch height—total support. Therefore there is an overhead of (total support) lines so that the edges of the active part of the patch can be correctly computed independent of any other patch. These overlapped sections will eventually be fetched from the memory twice, when the patch above or below this patch is processed.

The vertical patch 912 includes 16 vertical strips, each strip is one-pixel wide and 64-pixels high. The vertical patch 913 has two overlapped sections for filter support, one is at the top and one is at the bottom. For a filter size of 20, the top support is 9-pixel high and the bottom support is 10-pixel high for a total support height of 19. Therefore, the height of the active source region is 45.

Each vertical strip is processed by a vertical filter having a filter size of 20. The vertical filter processes the image data segments by segments from top to bottom of each patch. For example, a segment 914 having 20 pixels corresponds to the top of the vertical patch 912 and a segment 916 having 20 pixels corresponding to the bottom of the vertical patch 912. The vertical filter traverses from the segment 914 down to the segment 916.

The patch filtering described above is also applicable to other filtering directions as well. This includes the horizontal filter. Essentially, the use of patches improves performance by providing fast access to high-speed buffers, especially when the buffers are implemented on-chip. Patches are also reasonably sized so that they are not too costly to implemented.

Patches of image data can be processed, or filtered, by either the vertical filter or horizontal filter. Patches are transferred from memories or any other processing unit to a fast local buffer. The local buffer is preferably implemented as an on-chip buffer; however, off-chip buffers with fast access times are possible. From the local buffer, patches can be processed by the corresponding processor such as the horizontal or vertical processor. After the processing, the processed patches can be written back to the memory or to another processing unit.

When patches are processed in a down-scale filter, either vertically or horizontally, the typical processing steps include: (1) filtering using a finite impulse response (FIR) filter to bandlimit the input image data, (2) interpolating to re-sample the filtered data. The result of the down-scale filtering is the smaller subsampled patches.

A complete down-scale filtering usually involves both horizontal filtering and vertical filtering, corresponding to scaling in the horizontal and vertical directions. In that case, the processing is carried out in two passes: horizontal and vertical. During the horizontal pass, only horizontal processing is performed in patches. During the vertical pass, only vertical processing is performed in patches. In between passes, intermediate results are written into the memory. In one embodiment, the horizontal and vertical processing are performed at the same time within a patch.

Figure 9B:
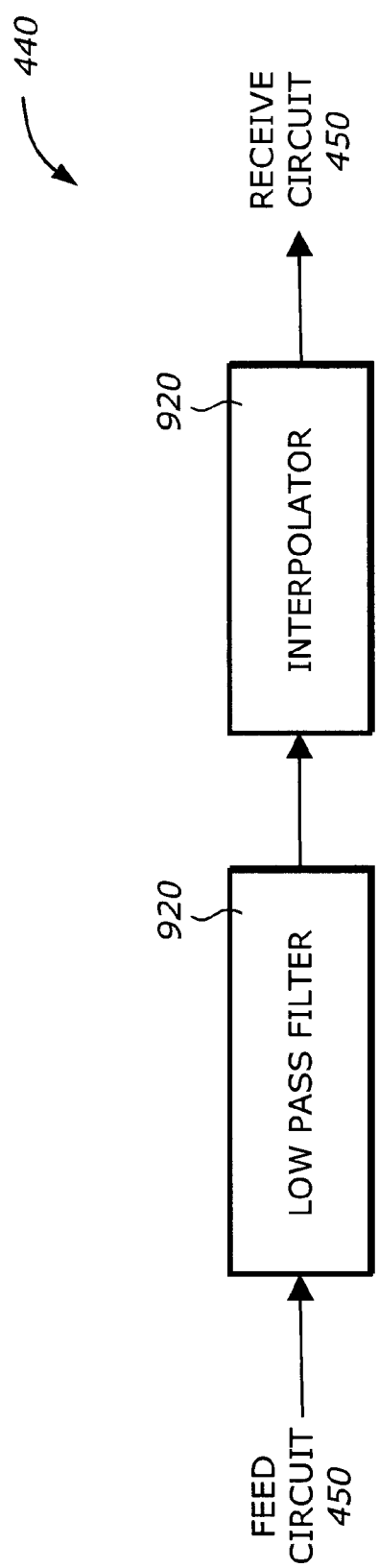
FIG. 9B is a diagram illustrating a down scale vertical filter shown in FIG. 4 according to one embodiment of the invention.

FIG. 9B is a diagram illustrating a down scale vertical filter 440 shown in FIG. 4 according to one embodiment of the invention. The down scale vertical filter 440 includes a low pass filter 920 and an interpolator 970.

The low pass filter 920 is a non-recursive filter that performs a weighted sum operation on the pixel data. In one embodiment, the filter size is 20. The interpolator 970 is also a non-recursive filter. The interpolator 970 uses a digital differential analyzer (DDA) to decide how to precisely position the filter on the input data for each output result. The interpolator 970 essentially performs decimation and interpolation. The interpolator 970 is similar to the horizontal interpolator. The details of the interpolator 970 is described in FIGS. 12A and 12B. The combination of the low pass filter 920 and the interpolator 970 accomplishes the down scale operation. The low pass filter 920 prevents aliasing on the decimation/interpolation. In general, the low pass filter is an N-tap FIR filter, and the interpolator is an M-tap P-phase multi-rate interpolator. In one embodiment, N=17, M=4 and P=16.

Figure 9C:
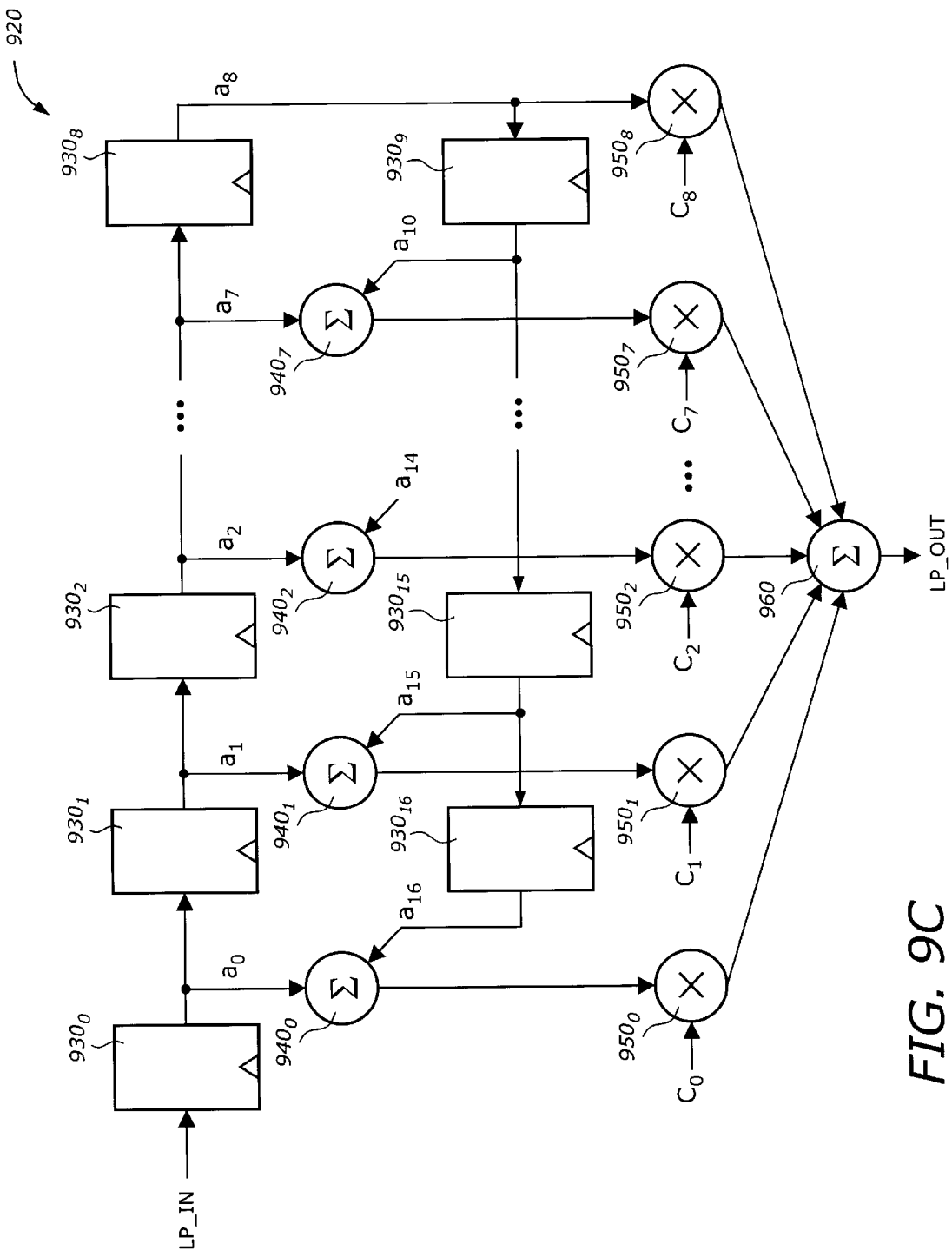
FIG. 9C is a diagram illustrating a low pass filter shown in FIG. 9B according to one embodiment of the invention.

FIG. 9C is a diagram illustrating a low pass filter 920 shown in FIG. 9B according to one embodiment of the invention. The low pass filter 920 includes seventeen registers 930$_0$ through 930$_{16}$, eight two-input adders/subtractors 940$_0$ through 940$_7$, nine multipliers 950$_0$ though 950$_8$, and nine-input adder 960.

The low pass filter performs the weighted sum operation of the 17-tap non recursive filter, or finite impulse response (FIR) filter. Because the filter is linear phase, the taps are symmetrical. Consequently, the number of multipliers can be halved. Let a0, a1, . . . , a16 be the pixel data, and c0, c1, . . . , c8 be the filter coefficients. The weighted sum operation is:

Filter output=c0*a0+c1*a1+c2*a2+c3*a3+c4*a4+c5*a5+c6*a6+ c7*a7+c8*a8+c7*a9+ c6*a10+c5*a11+c4*a12+c3*a13+c2*a14+c1*a15+c0*a16.  (5)

Filter output=c0*(a16+a0)+c1*(a15+a1)+c2*(a14+a2)+c3*(a13+ a3)+c4*(a12+a4)+c5*(a11+a5)+c6*(a10+a6)+c7*(a9+a7).  (6)

The registers 930$_0$ through 930$_{16}$ store the input pixel data a0 through a16, respectively. The adders 940$_0$ through 940$_7$ perform the subtractions as shown in the parentheses in equation (6) above. The multipliers 950$_0$ through 950$_8$ perform the multiplications of the coefficients c0 through c8 with the corresponding results as shown in equation (6) to generate nine products. Finally, the adder 960 adds the nine products to produce the filter output LPOUT.

The low pass filter 920 also performs rounding and saturation to 0–255. It also has a bypass option, which takes the value a9 and sends it out.

Figure 9D:
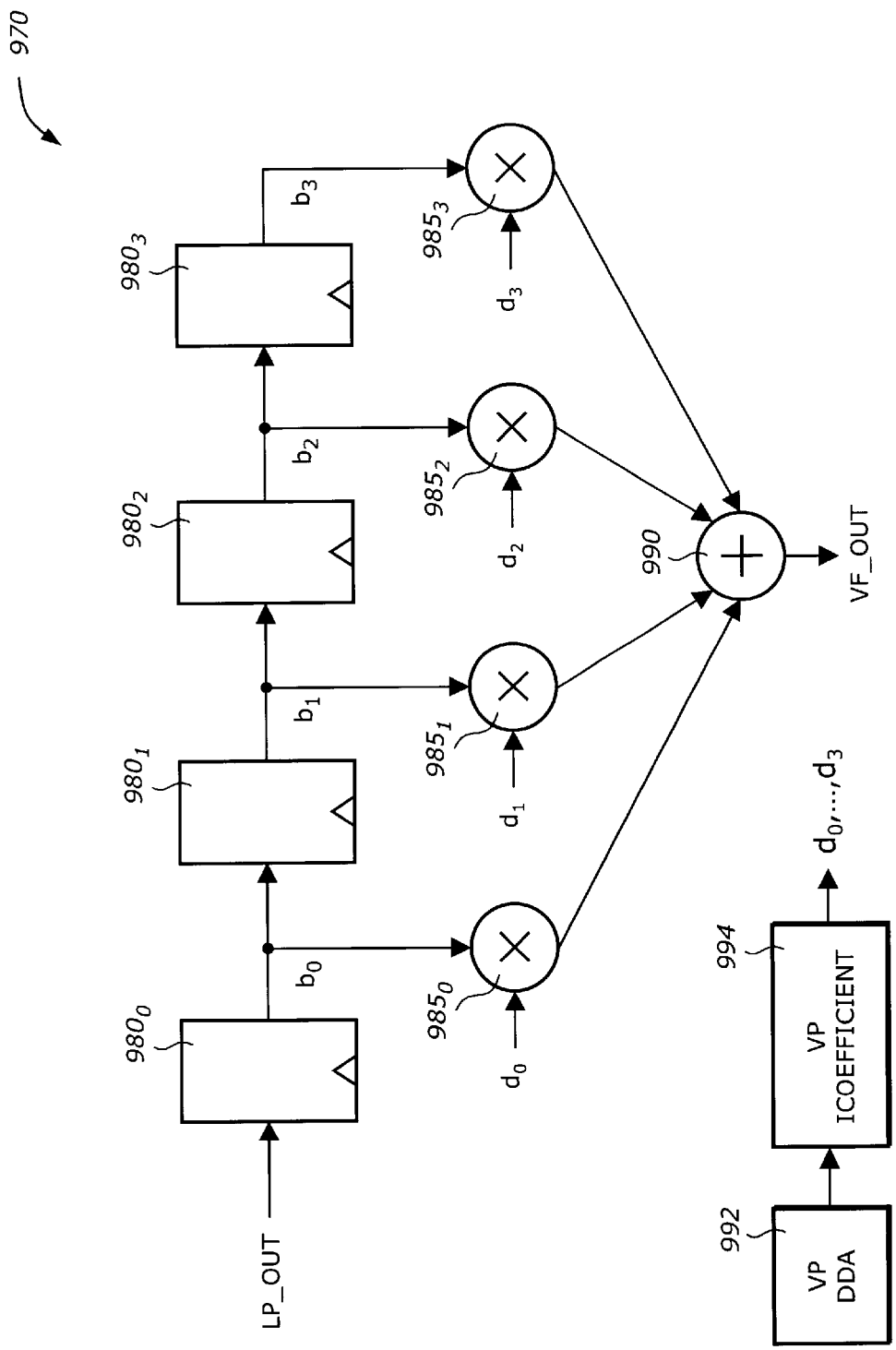
FIG. 9D is a diagram illustrating a down scale interpolator shown in FIG. 9B according to one embodiment of the invention.

FIG. 9D is a diagram illustrating an interpolator 970 shown in FIG. 9B according to one embodiment of the invention. The interpolator 970 includes a VP digital differential analyzer (DDA) 992, a VP interpolator coefficient storage (VP_ICOEFF) 994, and four registers 980$_0$ through 980$_3$, four adders 985$_0$ through 985$_3$, and a 4-input adder 990. The VP_DDA 992 and the VP_ICOEFF 994 are similar to the horizontal filter and are described later. Essentially the interpolator contains 4 taps, each tap requires a coefficient for computation. A set of 4 coefficients can be selected for the interpolating. The filter supports 16 phases, so there are 16 sets of 4 coefficients. When operating the VP_DDA 992 provides the phase setting with which one of the sets of 4 coefficients is selected from such 16 sets. The VP_ICOEFF storage 994 stores these sets of coefficients.

The interpolator 970 is a 4-tap polyphase non recursive filter. In one embodiment, the filter coefficients are fixed and determined by using a cubic spline algorithm. The first and the last coefficients are 8-bit signed, and the middle two are 11-bit unsigned. The interpolator 970 also performs rounding and saturation and has a bypass feature.

The interpolator performs the following operation:

VF_OUT=b0*d0+b1*d1+b2*d2+b3*d3

The registers 980$_0$ through 980$_3$ store the pixel data b0, b1, b2, and b3. The multipliers 985$_0$ through 985$_3$ perform the multiplications b0*d0, b1d1, b2*d2, and b3*d3, respectively. The adder 990 adds the four products together to generate the filter output VP_OUT.

Figure 10:
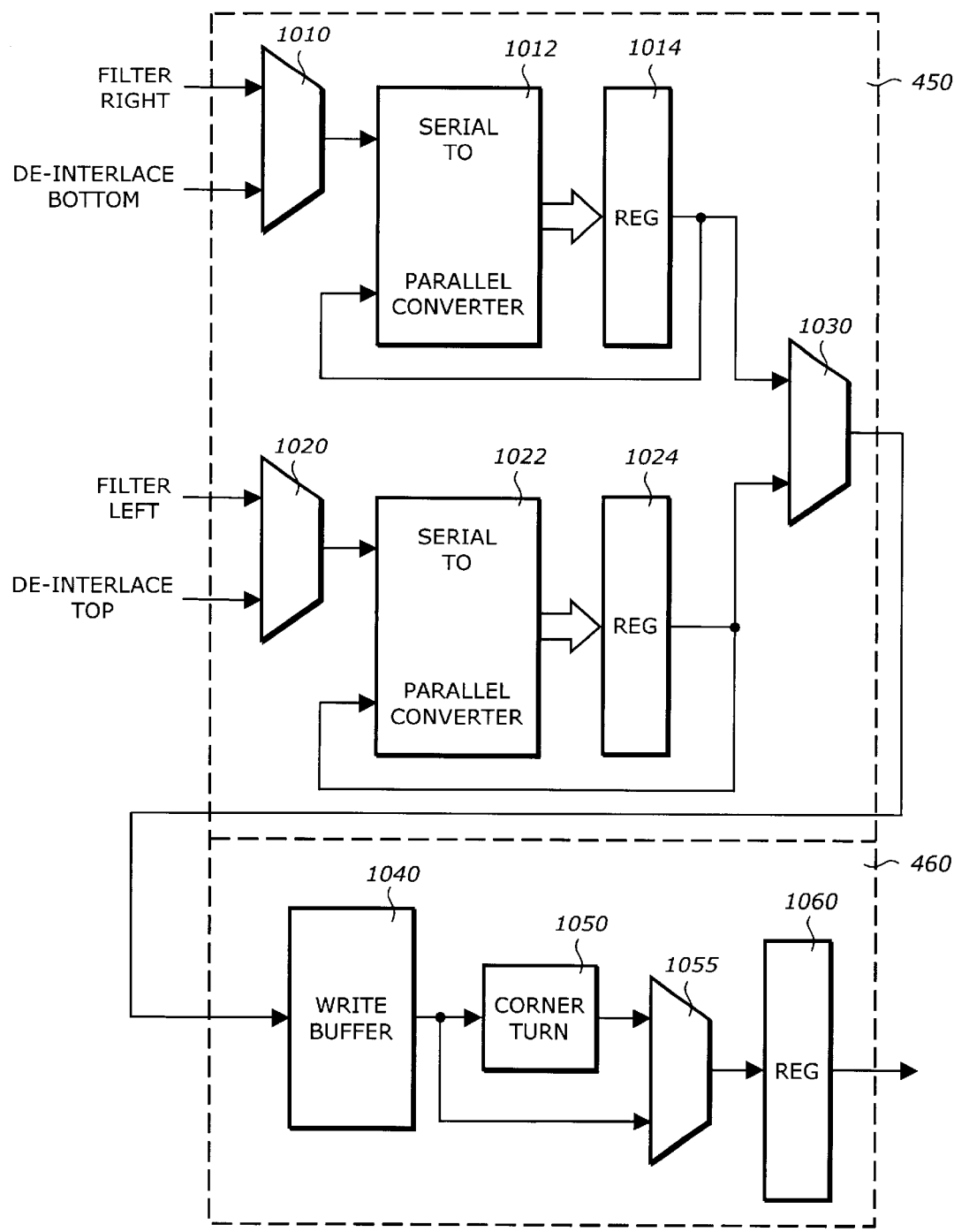
FIG. 10 is a diagram illustrating a VP receive circuit and a VP write interface circuit shown in FIG. 4 according to one embodiment of the invention.

FIG. 10 is a diagram illustrating a VP receive circuit 450 and a VP write interface circuit 460 shown in FIG. 4 according to one embodiment of the invention. The VP receive circuit 450 includes multiplexers 1010, 1020, and 1030, two serial-to-parallel converters 1012 and 1022, and two registers 1014 and 1024. The VP write interface circuit 460 includes a write buffer 1040, a comer turn circuit 1050, a multiplexer 1055, and a register 1060.

The VP receive circuit 450 receives the serial pixel data from the de-interlace circuit and the down-scale filter and converts into parallel words. The VP receive circuit 450 also handles the case of down-scaling to a progressive result. For efficiency, transactions to the memory controller use pairs of words. These words correspond to both lines being even or both lines being odd. Because the data coming out of the down-scale filter and the de-interlace circuit represents consecutive lines in the frame, the VP receive circuit 450 steers each sequentially received pixel to the appropriate place in the write buffer 1040 in the VP write interface circuit 460.

The two multiplexers 1010 and 1020 select the pixel data from the down-scale filter and the de-interlace circuit. The multiplexer 1010 selects pixel data from the down-scale filter at the right position and the bottom field in the interlace circuit. The multiplexer 1020 selects pixel data from the down-scale filter at the left position and the top field in the interlace circuit. The serial-to-parallel converters 1012 and 1022 converts the serial data selected by the multiplexers 1010 and 1020, respectively, into parallel word. The parallel data is then loaded into the registers 1014 and 1024. The multiplexer 1030 selects from the right and left filter positions for the down-scale filtering or the bottom and top field for the de-interlace operation.

The write buffer 1040 stores the parallel words in a 128×8 byte buffer. The comer turn circuit 1050 performs a transposition, i.e., it converts the row pixel data into column pixel data. Since the pixel data from the down-scale filter is the column data due to the transposition in the read interface circuit, the corner turn circuit 1050 essentially restores the pixel organization to the row-ordered data to be written into the memory. The multiplexer 1055 selects between the transposed data or data from the write buffer 1040. The register 1060 stores the result to be written into the memory 140.

Figure 11:
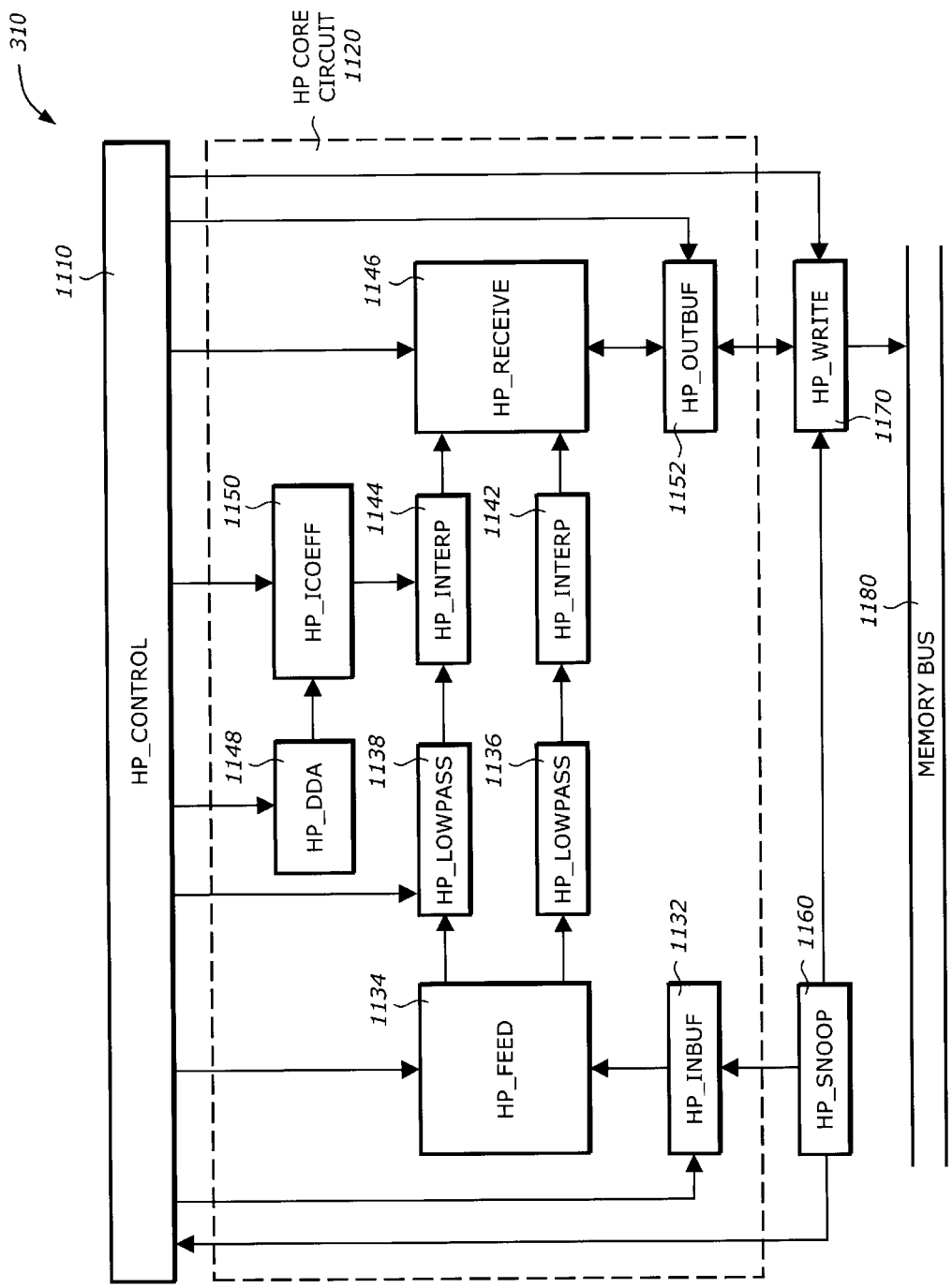
FIG. 11 is a diagram illustrating a horizontal processor (HP) shown in FIG. 3 according to one embodiment of the invention.

FIG. 11 is a diagram illustrating a horizontal processor (HP) 310 shown in FIG. 3 according to one embodiment of the invention. The HP 310 includes an HP control circuit 1110, an HP core circuit 1120, an HP snoop circuit 1160, an HP write circuit 1170, and a memory bus 1080.

The HP control circuit 1110 generates timing and control signals to the HP core circuit 1120 and the HP write circuit 1170. The HP control circuit 1110 also receives status information from the HP snoop circuit 1160. The HP core circuit 1120 performs the core operation for the horizontal filter.

The HP snoop circuit 1160 snoops the data written from the MCE to the MIF. The format of the MCE's data is in macroblock units, which in turn are split into two separate sets of writes, a top and a bottom write. Each set of writes contains 16 words (64 bits) of Y, 4 words of Cb, and 4 more words of Cr. The HP snoop circuit 1160 snoops on the descriptor post, data write and buffer retire. In the descriptor post, the HP snoop circuit 1160 extracts information on where the data is stored in the frame buffer area.

The HP write circuit 1170 writes the processed pixel data from the HP core circuit 1120 to the MIF via the memory bus 1080. The writing can be done for an entire macroblock.

The HP core circuit 1120 performs the core horizontal filtering operation. The HP core circuit 1120 includes an HP input buffer (HP_INBUF) 1132, an HP feed circuit (HP_FEED) 1134, two HP low pass filters (HP_LOWPASS) 1136 and 1138, two HP interpolators (HP_INTERP) 1142 and 1144, an HP receive circuit (HP_RECEIVE) 1146, an HP output buffer (HP_OUTBUF) 1152, and HP digital differential analyzer (DDA) 1148, and an HP coefficient buffer (HP_ICOEFF) 1150.

The HP_INBUF 1132 stores the macroblock data in a 512×64 RAM organized as an array of 32×128 bytes. The HP_FEED 1134 has two 64-bit registers, each of which loads in 64 bits at once from the HP_INBUF 1132 and shifts out 8 bits at a time to the HP_LOWPASS 1136 and 1138. The HP_FEED 1134 includes two 8-bit shift registers to send out two parallel byte streams in the same horizontal position.

Each of the HP_LOWPASS filters 1136 and 1138 is essentially similar to the lowpass filter in the down-scale vertical filter 440. In one embodiment, each of the HP_LOWPASS filters 1136 and 1138 is a 17-tap non recursive filter. Each of the HP_INTERP circuits 1142 and 1144 is also similar to the interpolator in the down-scale vertical filter 440.

The HP_RECEIVE circuit 1146 contains two 64-bit registers. Each of these register banks updates 8 bits at a time with the incoming filter results. Every 8 cycles, the accumulated 64-bit result is written into the HP_OUTBUF circuit 1152. The HP_OUTBUF 1152 buffers the result pixel data. The HP_RECEIVE circuit 1146 also reads back the data from the HP_OUTBUF when there is an odd number of data produced.

The HP_DDA 1148 performs the down sampling phase and skip calculations. The HP_DDA 1148 updates the HP_ICOEFF 1150 which in turns provides information to the HP_INTERP 1144.

Figure 12A:
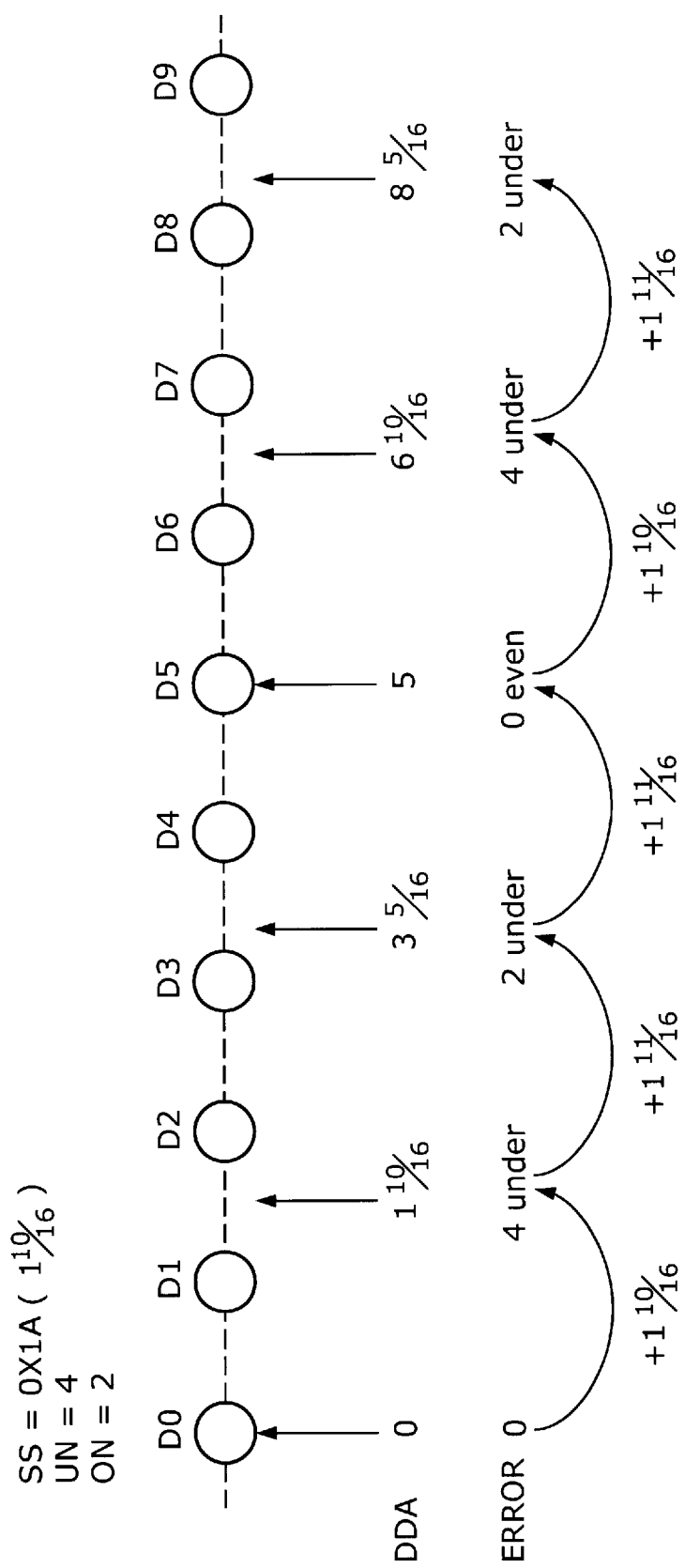
FIG. 12A is a diagram illustrating an example for a digital differential analyzer (DDA) according to one embodiment of the invention.

FIG. 12A is a diagram illustrating an example for a digital differential analyzer (DDA) according to one embodiment of the invention.

The HP_DDA 1148 has 4 bits of decimal precision to calculate the correct phase (0 through 5), and it accumulates the error separately. There are three parameters for the DDA: step size (SS), undershoot macroblock number (UN), and overshoot macroblock number (ON). The SS is the down-scaling factor, truncated to the nearest 1/16. The UN is the number of macroblocks that the DDA will undershoot the target by, using SS as the step value. The ON is the number of macroblocks that the DDA will overshoot the target by, using SS+1 as the step value. The expressions for SS, UN, and ON are:

SS=INT(16*source width/destination width)

UN=16*source width−destination width*SS

ON=destination width*(SS+1)−16*source width.

All three values have 4 decimal places. As the DDA steps through, it accumulates the net under/overshoot error, and it adjusts the phase by adding 1 to the phase value as long as it is undershooting the target.

In the example shown in FIG. 12A, the down scaling is from 10 to 6. The SS is 1 10/16. The UN is 4 and the ON is 2. The DDA starts at the pixel D0 where the error is 0. The DDA steps through at 1 10/16 step size (truncated to the nearest 1/16). At the last step when the DDA gets past pixel D8, the DDA reaches 9 5/16 with undershoot error of 2.

The filters run at one input pixel per cycle, so a pixel counter starts at 0 and counts 1, 2, 3, etc. Every time this value matches the integer part of the DDA, the corresponding phase is used to get the appropriate interpolation taps, and the result is taken.

The DDA value and the error are accumulated across an entire line of data. When the line is broken into patches, the DDA should be required to restore its state. For example, after the last pass of luma filtering, the DDA saves its values into a register, and it loads up the old chroma DDA settings before it filters the chroma.

Figure 12B:
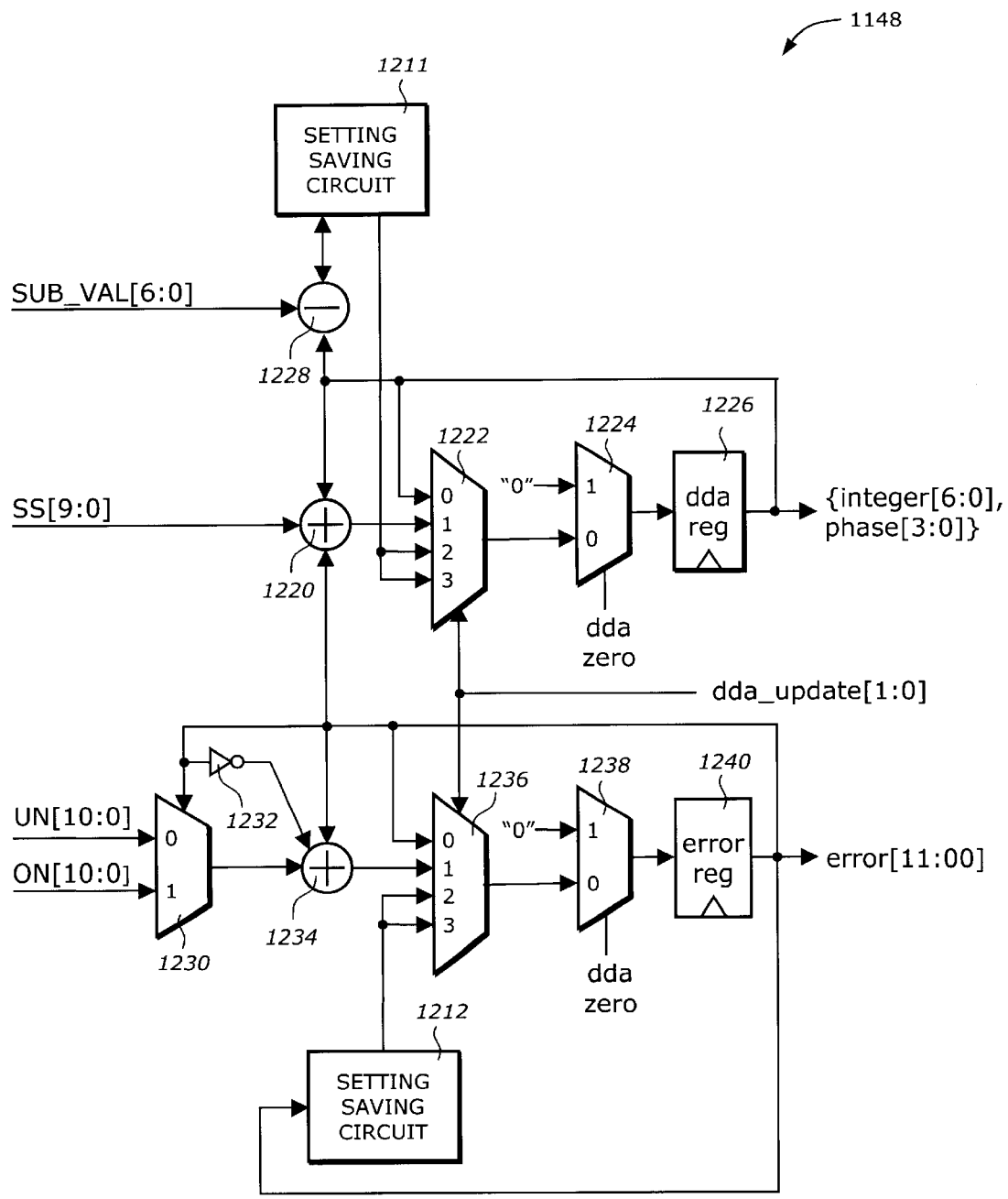
FIG. 12B is a diagram illustrating a DDA shown in FIG. 11 according to one embodiment of the invention.

FIG. 12B is a diagram illustrating a DDA shown in FIG. 11 according to one embodiment of the invention. The DDA 1148 includes a DDA core circuit 1210 and two setting saving circuits 1211 and 1212.

The DDA core circuit 1210 generates the integer and the phase values. The DDA core circuit 1210 includes adders 1220 and 1234, two 4-input multiplexers 1222 and 1236, 2-input multiplexers 1224, 1230 and 1238, a DDA register 1226, a subtractor 1228, a multiplexer 1230, and an error register 1240.

The adder 1220 adds the SS value by incrementing the integer and phase output values with the error. The adder 1234 adds the UN or ON value to the error value. The 4-input multiplexers 1222 and 1236 allow the update using the dda_update[1:0] select signal as follows: 0 (re-circulate value), 1 (increment by one step value), 2 (load saved luma settings), and 3 (load saved chroma setting). The multiplexers 1224 and 1238 allow resetting the DDA and error to zero and is controlled by the dda_zero signal. The DDA register and the error register 1226 and 1240 stores the DDA results (integer and phase) and the error value.

The subtractor 1228 subtracts the number of valid pixels processed, sub_val[6:0] from the integer portion of the DDA result so that the next run can start with a pixel count of 0.

The setting saving circuits 1211 and 1212 save the DDA result (adjusted by the sub_val[6:0]) and the error, respectively.

Figure 12C:
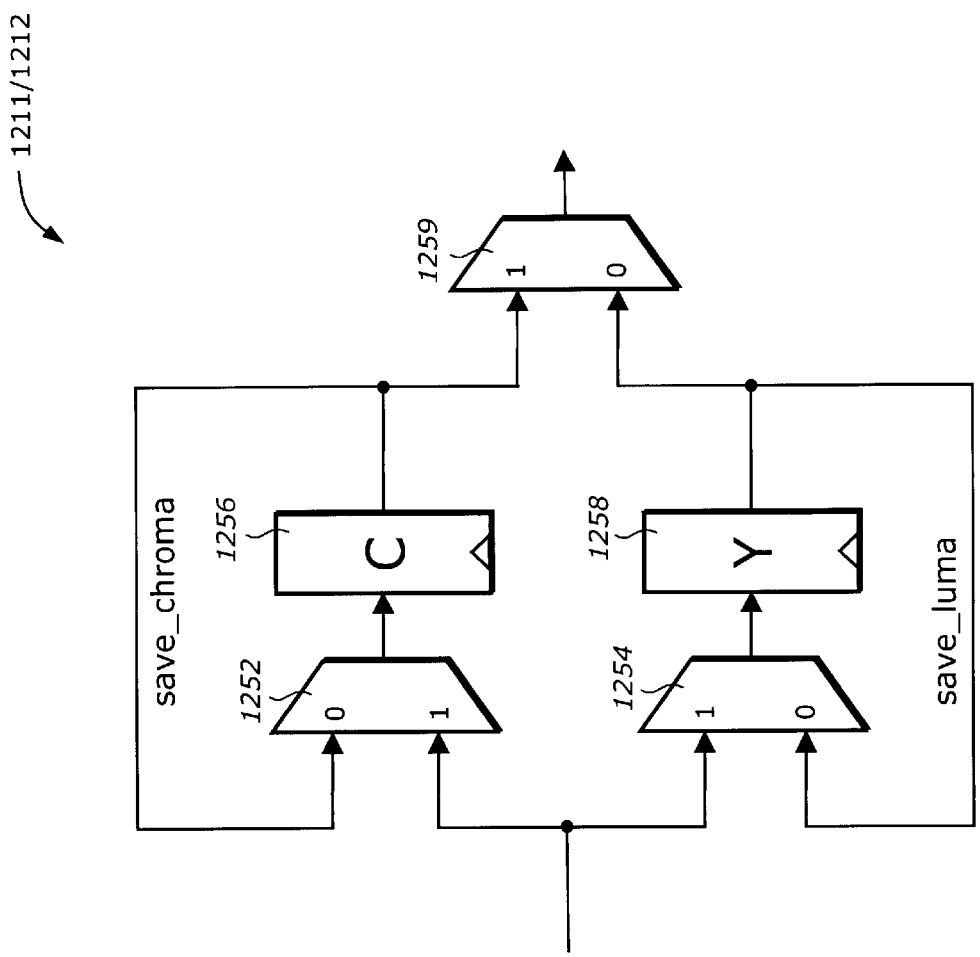
FIG. 12C is a diagram illustrating a setting saving circuit shown in FIG. 12B according to one embodiment of the invention.

FIG. 12C is a diagram illustrating a setting saving circuit 1211/1212 shown in FIG. 12B according to one embodiment of the invention. The setting saving circuit 1211/1212 includes multiplexers 1252, 1254, and 1259, and two registers 1256 and 1258.

The multiplexers 1252 and 1254 select the start value for chroma and luma processing, respectively. The start value is the adjusted DDA result (for 1211) or the error value (for 1212). The registers 1256 and 1258 store the settings for chroma and luma, respectively. The outputs of the registers are fed back to the multiplexers 1252 and 1254, respectively, for re-circulating of the settings. The multiplexer 1259 selects between chroma and luma saved settings.

Figure 13A:
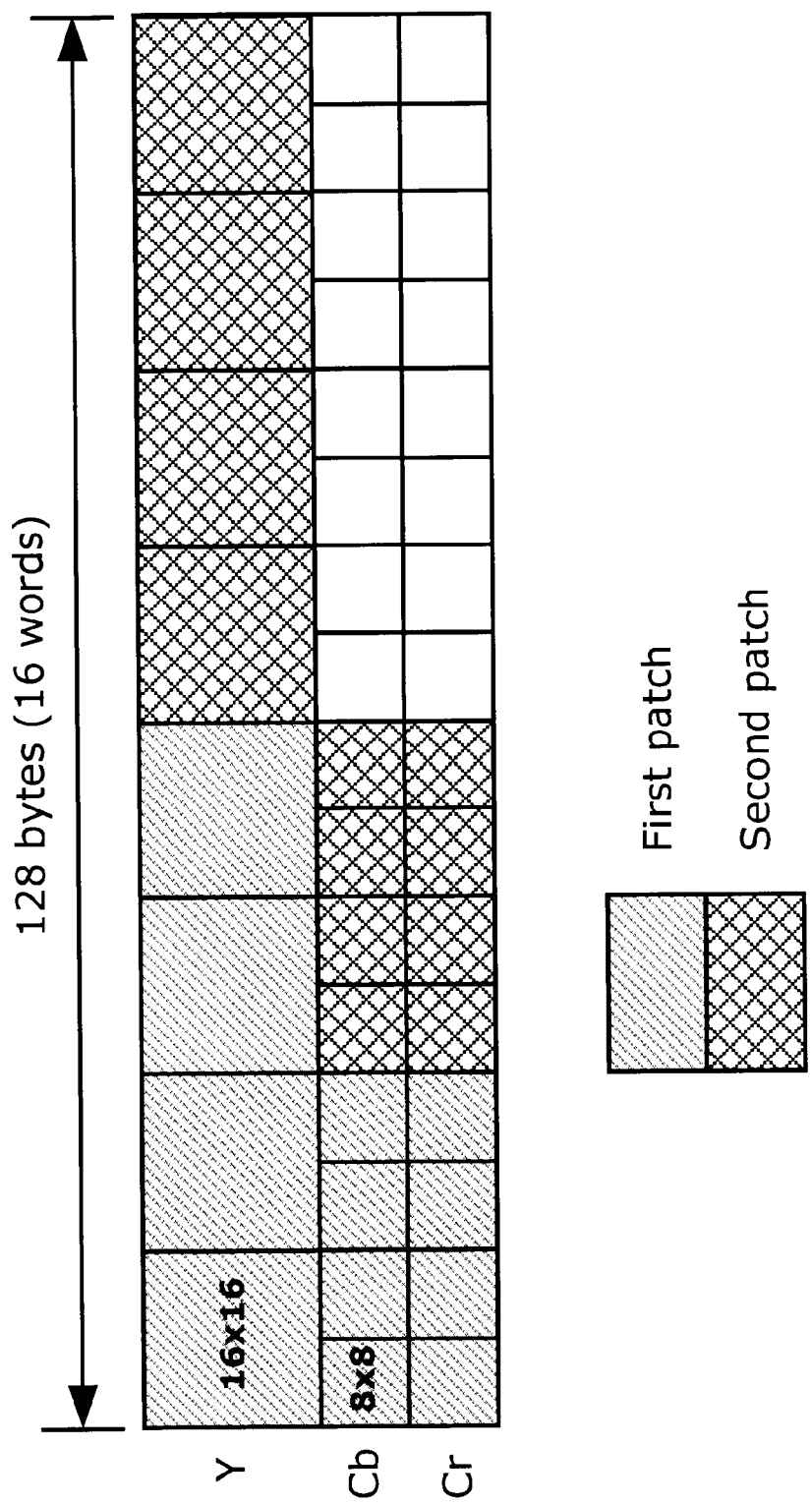
FIG. 13A is a diagram illustrating an organization of the HP input buffer shown in FIG. 11 according to one embodiment of the invention.

FIG. 13A is a diagram illustrating an organization of the HP input buffer shown in FIG. 11 according to one embodiment of the invention.

The HP input buffer is organized as 32×128 bytes and stores the macroblocks for Y, Cb, and Cr. The HP input buffer stores eight 16×16 Y macroblocks, sixteen 8×8 Cb macroblocks, and sixteen 8×8 Cr macroblocks. The macroblocks are stored to allow processing of two consecutive patches as shown in the shaded boxes of FIG. 13A.

The processing of the patches allows the replication of overlapped segments as the filter traverses. Depending on what part of the region, the patch configuration may replicate the support of 9 or 19 width (or height for vertical filter).

FIG. 13B is a diagram illustrating a patch configuration according to one embodiment of the invention. The patch configuration includes patch 1310, patch 1320, and patch 1330.

The patch 1310 corresponds to the first patch (or the rightmost patch) in the processing. The duplicated 9 components are stored in the dashed lines on the left of the patch. The patch 1320 corresponds to the middle patch in the processing. The previous 19 components (old data) are stored in the dashed lines for the previous 19 components. The patch 1330 corresponds to the last patch (or the leftmost patch) in the processing. The previous 19 components (old data) are stored on the left of the patch and the duplicated 10 components are stored on the right of the Y macroblock.

A patch is characterized by the following information:

first_patch: This indicates duplication on the left of 9 components. Otherwise, the patch is either the middle patch or the last patch and the previous 19 components are read out.

last patch: This indicates duplication on the right of 10 components. Otherwise, the patch is either the first patch or the middle patch and nothing is needed at the right side of the patch.

head_ptr_y[2:0]: This indicates which 16-wide column (0–7) of the input buffer contains the first luma component for filtering.

head_ptr_c[3:0]: This indicates which 8-wide column (0–15) contains the first chroma component filtering.

tail_ptr[3:0]: This indicates the last column of the input buffer. For chroma, the full value (0–15) is used, for luma, the MSB is cut off, so the value is between 0–7.

Figure 13C:
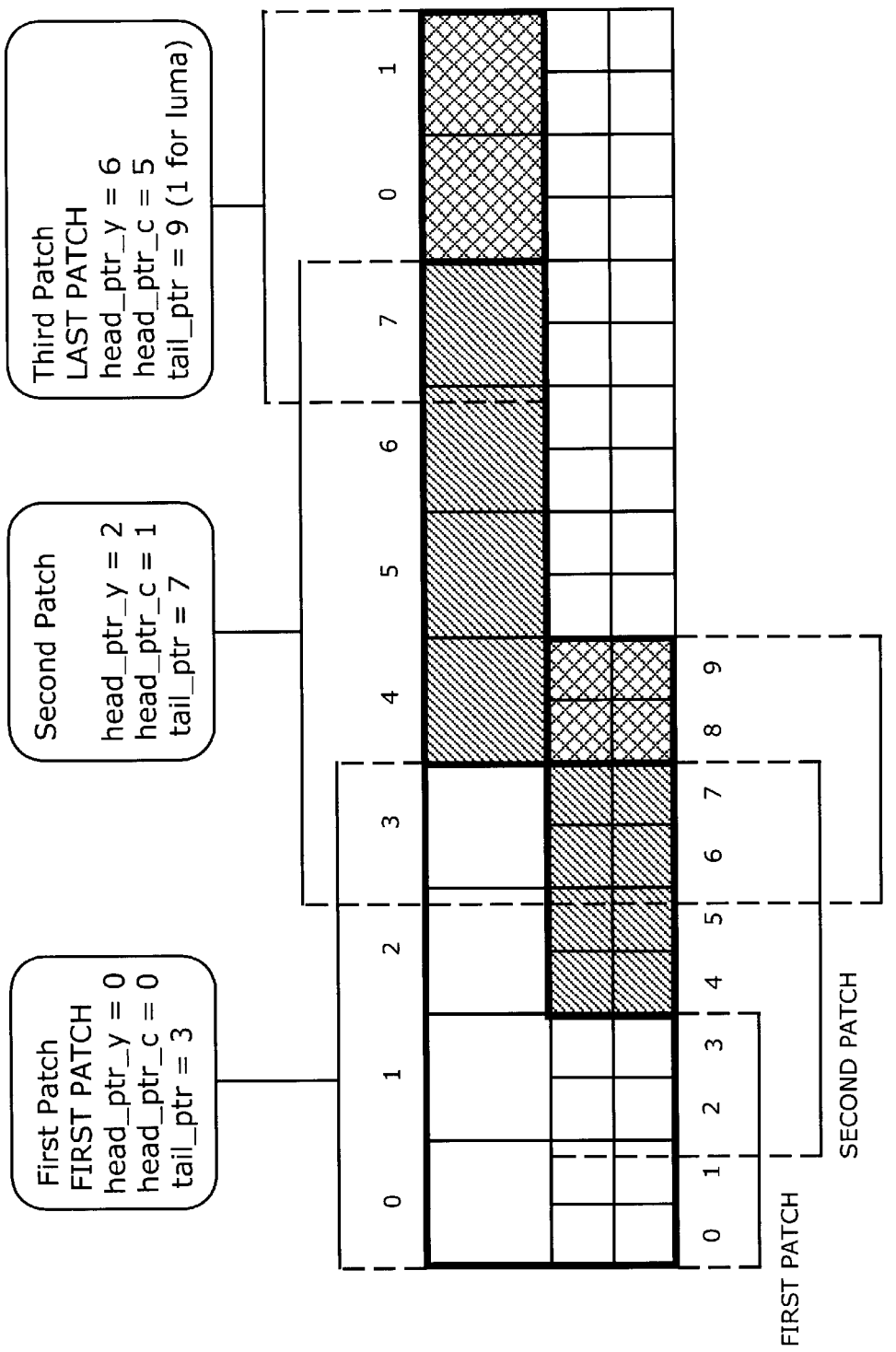
FIG. 13C is a diagram illustrating an example for a patch processing according to one embodiment of the invention.

FIG. 13C is a diagram illustrating an example for a patch processing according to one embodiment of the invention. This example shows the information given for each patch execution in a picture with a region of interest (ROI) of 10 macroblocks. There are three patches: the first patch, the second patch, and the last patch.

The first patch has Y macroblocks from 0 to 3, and chroma macroblocks from 0 to 3. The head_ptr_y and head_ptr_c are both 0, and the tail_ptr is 3. The second patch has Y macroblocks from 4 to 7, and chroma macroblocks from 4 to 7. In addition, the second patch stores the previous 19 components for both Y and chroma macroblocks, occupying the Y macroblock 2 and the chroma macroblock 1. Therefore, the head_ptr_y is 2 and the head_ptr_c is 1. The tail_ptr is 7 pointing to the last column in the patch for both Y and chroma macroblocks. The third patch has Y macroblocks 0 to 1 in the next storing cycle of the input buffer, and chroma macroblocks 8 and 9. Since the third patch is the last patch, it also stores the previous 19 components, occupying Y macroblock 6 and chroma macroblock 5. Therefore, head_ptr_y is 6, head_ptr_c is 5, and tail_ptr is 9 (for chroma) and 1 (for luma).

Figure 14:
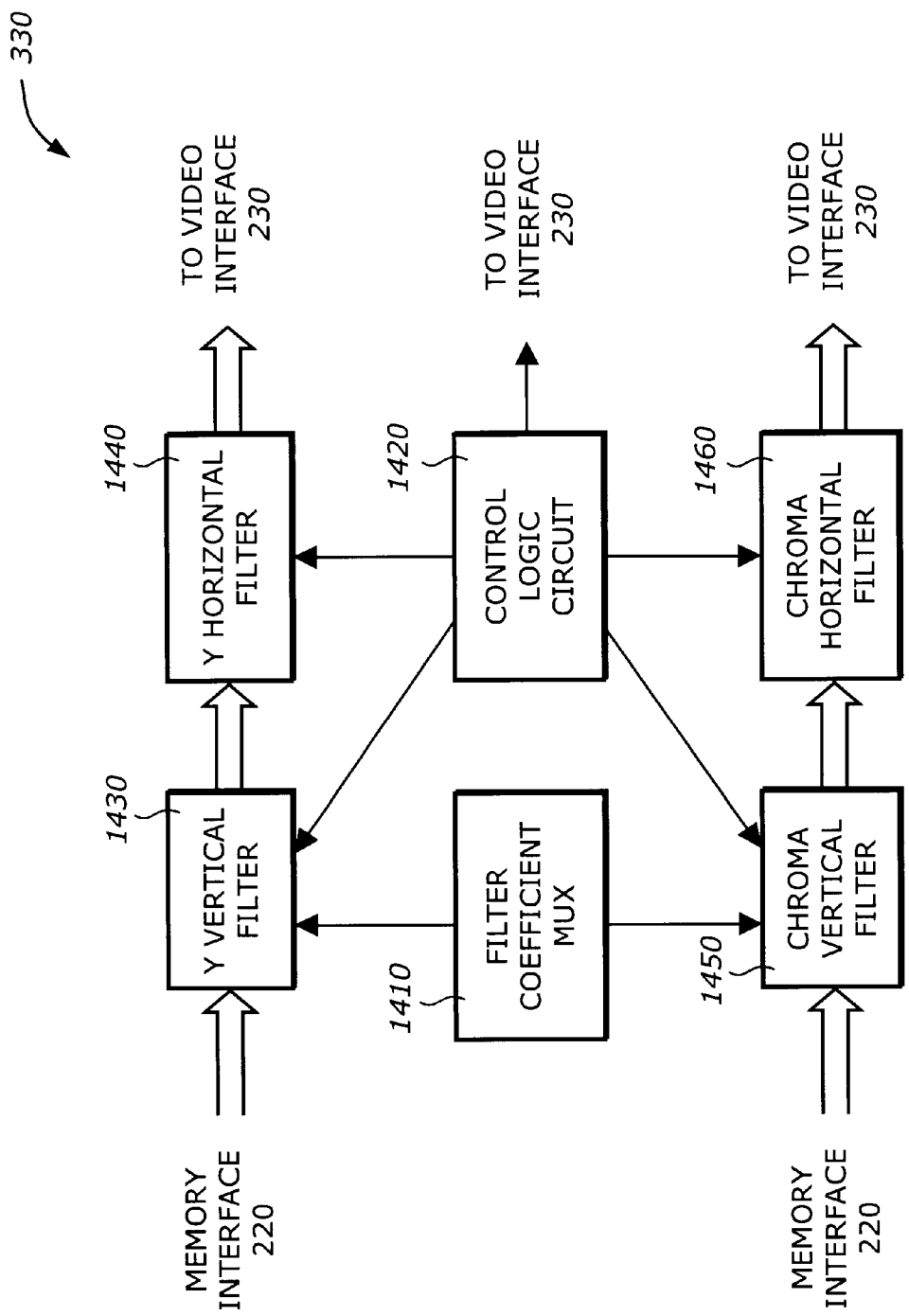
FIG. 14 is a diagram illustrating an up-scaling unit according to one embodiment of the invention.

FIG. 14 is a diagram illustrating an up-scaling unit 330 according to one embodiment of the invention. The up-scaling unit 330 includes a filter coefficient multiplexer 1410, a control logic circuit 1420, a Y vertical filter 1430, a Y horizontal filter 1440, a chroma vertical filter 1450, and a chroma horizontal filter 1460.

The filter coefficient multiplexer 1410 provides the filter coefficients for the luma and chroma processing chains. The control logic circuit 1420 provides timing and control signals to the various filters used in the processing chain. The Y vertical filter 1430 and the Y horizontal filter 1440 performs up-scaling operations on luma vertical data and then luma horizontal data, respectively. The chroma vertical filter 1450 and the chroma horizontal filter 1460 performs up-scaling operations of chroma vertical data and chroma horizontal data. The results of the Y and chroma processing chains are sent to the video interface 230.

The vertical and horizontal filters 1430, 1450 and 1440, 1460 may be implemented using the same architecture as described in FIGS. 9B, 9C, and 9D. The horizontal filters 1440 and 1460 can be implemented as an in-line N-tap multi-rate FIR filter, where N is any properly selected integer. In one embodiment, N=4. The vertical filters 1430 and 1450 can be implemented as an in-line N-tap multirate interpolator where N is a function of the number of pixels in the source image scan line. The tap pixel data are provided from a line buffer with size sufficiently large to hold a number of filter lengths. In one embodiment, the vertical in-line tap size is 2 or 3 and the line buffer size is 1440-pixels long.

The data to the Y and chroma vertical filters can be from either external memory buffer (e.g., memory 140), or on-chip buffers. The output of the vertical filter is fed directly to the corresponding horizontal filter.

The scaling units can be used to scaled the image data components (e.g., luma, chroma) separately for color format conversion, such as conversion between the 4:2:2 and 4:2:0 formats.

The scaling units and the de-interlace circuit can be used in display format conversion from a source format to a destination format. For example, the source format may include 240P, 480I, 480P, 720P, and 1080I, and the destination format may include 480I, 480P, 720P, and 1080I, each with 60 frames per second (fps), where P denotes progressive and I denotes interlaced.

As an example, suppose it is desired to convert the source format of 720P to the destination format of 1080I. The conversion includes the following steps. First, the source 720P image is down-scaled to a 540P image using the down-scale filter. Then each progressive frame is converted into a field for interlaced display. For each output line within a field, the filter fetches several lines from the progressive frame, some lines residing in the on-chip buffer while other lines residing in the external memory. Since each field has one of two possible positions: top or bottom, a frame has to be adjusted before forming the field data. This is handled by the filter and format conversion circuit which adjusts the starting position of the filter one line down from the starting position of a top field.

FIG. 15A is a table illustrating format conversion from all input formats to high resolution displays according to one embodiment of the invention. The source format includes a source low resolution progressive (SLRP), low resolution interlaced (SLRI), high resolution progressive (SHRP), and high resolution interlaced (SHRI). The destination format includes destination high resolution progressive (DHRP) and destination high resolution interlaced (DHRI).

The table shows processing steps to perform the format conversion. These processing steps invoke the scaling and/or the de-interlacing operations as appropriate. The processing can be done by hardware or software or any combination of hardware and software.

From SLRP to DHRP:

The up-scaling unit reads a frame in the memory.

The up-scaling unit up-scales the image to a frame image.

The display controller displays the resulting frame image.

From SLRP to DHRI:

The up-scaling unit reads a frame in memory.

The up-scaling unit up-scales the frame image to a field image.

The display controller displays the resulting field image.

etc.

FIG. 15B is a table illustrating format conversion from all input formats to low resolution displays according to one embodiment of the invention. The source format includes a source low resolution progressive (SLRP), low resolution interlaced (SLRI), high resolution progressive (SHRP), and high resolution interlaced (SHRI). The destination format includes destination low resolution progressive (DLRP) and destination high resolution interlaced (DLRI).

The table shows processing steps to perform the format conversion. These processing steps invoke the scaling and/or the de-interlacing operations as appropriate. The processing can be done by hardware or software or any combination of hardware and software.

From SLRP to DLRP:

The up-scaling unit reads a frame in the memory.

The display controller displays the resulting frame image.

From SLRP to DLRI:

The vertical processor reads a frame in memory and vertically down-scales the image to form one field. The resulting field is written into the memory.

The up-scaling unit reads the field in memory.

The display controller displays the resulting field image. etc.

Figure 16A:
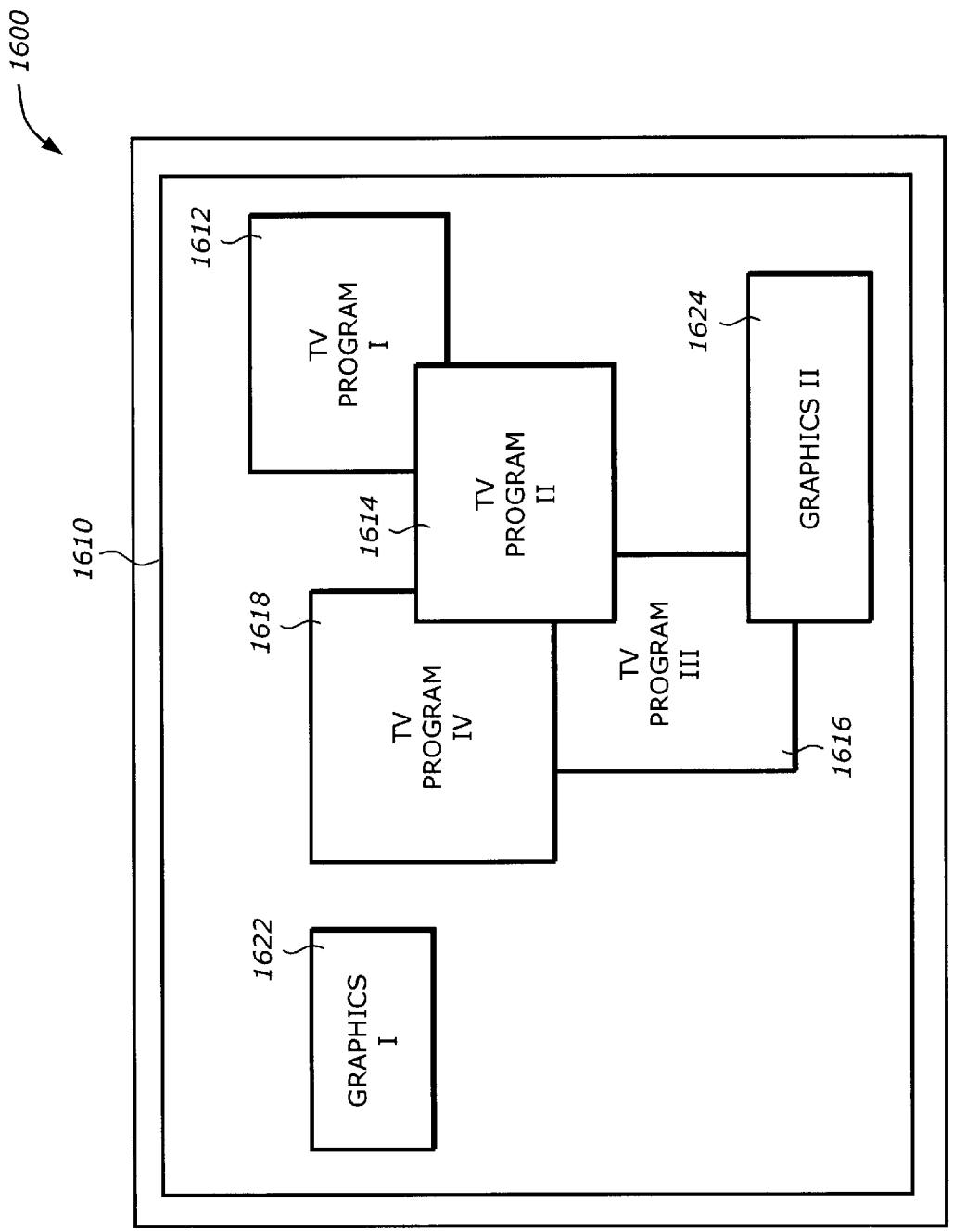
FIG. 16A is a diagram illustrating multiple pictures-in-picture on a television monitor according to one embodiment of the invention.

FIG. 16 is a diagram illustrating multiple pictures-in-picture on a television monitor 1600 according to one embodiment of the invention. The display monitor 1600 may display a number of display regions corresponding to various sources, including video, graphics, and television.

In the exemplary diagram of FIG. 16, the display monitor 1600 may display the optional background program 1610 on which a number of display regions are overlaid. These regions include a television (TV) program I 1612, a TV program II 1614, a TV program III 1616, a TV program IV 1618, a graphics area I 1622, and a graphics area II 1624.

These display regions may come from any source including TV stations, satellite transmission systems, cable TV systems, internet, video cameras, computer graphics systems, etc. The original display resolutions and scanning modes (progressive or interlaced) of these sources may not be the same as one another, and they may not be the same to the display monitor 1600. The format conversion technique in the present invention allows images from any input source to be scaled and processed appropriately to be displayed on the monitor in a picture-in-picture (PIP) display mode. The result is a high quality and versatile display system.

Figure 16B:
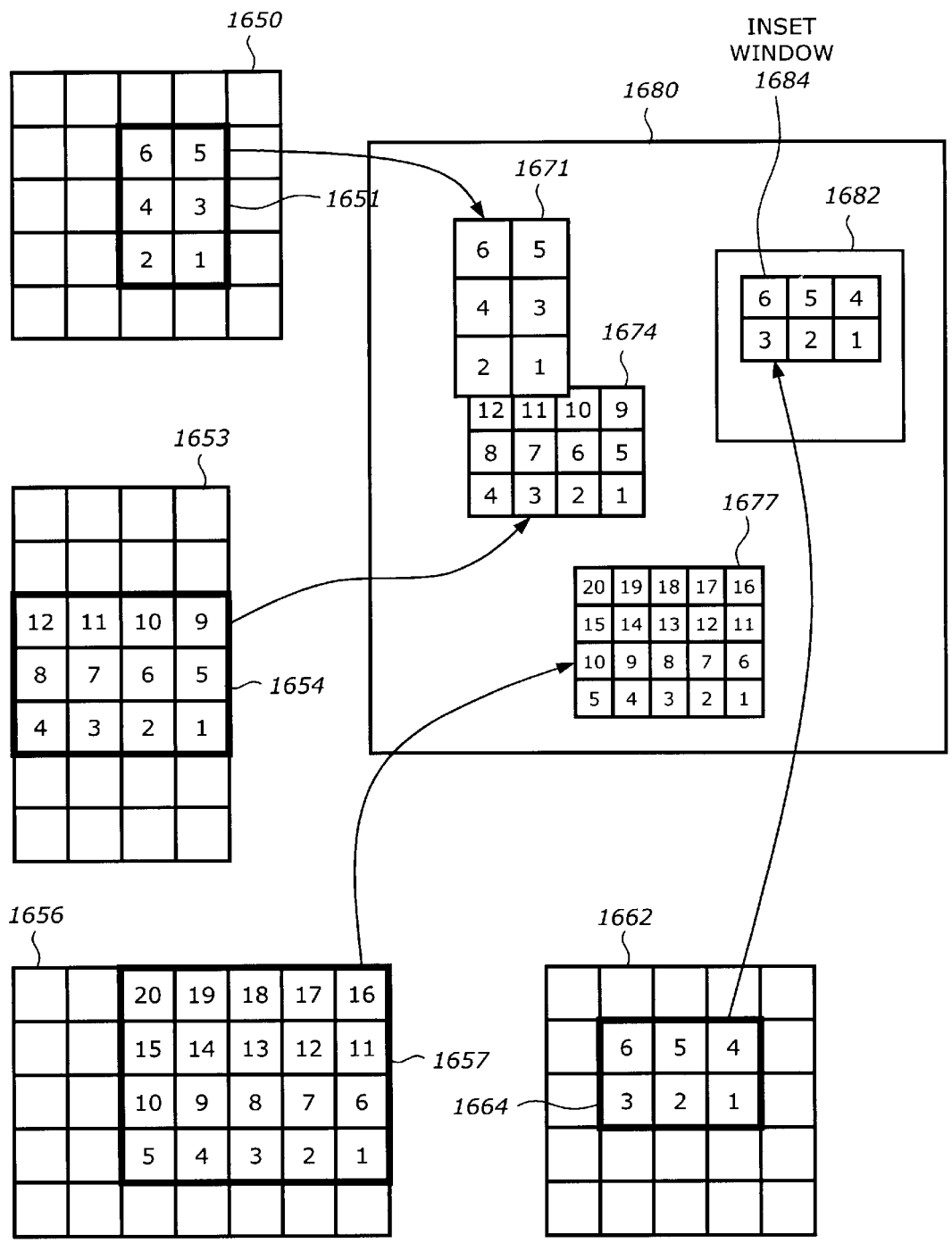
FIG. 16B is a diagram illustrating object compositing using patches from memory to display on a television monitor according to one embodiment of the invention.

FIG. 16B is a diagram illustrating compositing objects using patches from memory to display on a television monitor according to one embodiment of the invention. The image sources include images from memories 1650, 1653, 1656, and 1662. The display area 1680 includes the pictures 1671, 1674, 1677, and 1682

The memories 1650, 1653, 1656, and 1662 contain image data from various sources such as TV, graphics, and video encoders. The memories 1650, 1653, 1656, and 1662 contain subimages 1651, 1654, 1657, and 1664, respectively. The subimages 1651, 1654, 1657, and 1664 contain a number of patches as shown, and are transferred to the display buffer to correspond to the picture objects 1671, 1674, 1677, and 1684, respectively. The picture objects 1671 and 1674 are overlapped to each other. The picture object 1677 does not overlap with any other pictures. The picture object 1684 is an inset window which is inside and overlaid on the picture object 1682.

Any combination of display arrangements is possible. The images may come from the same source or different sources. The pictures to be displayed may be an up-scaled, down-scaled, or un-scaled versions of the corresponding subimages in the memories. The result patches from the subimages can be written to the buffer memory for display in any order necessary to achieve the desired results. In one embodiment, the patches are written from back to front, such that the patch corresponding to the top most position is written last.

Object compositing can be performed efficiently using patches. Several results can be achieved including overlapping, picture-in-picture, animation, cinematic sequence, and progressive cinematic sequence. To further improve processing time, the frame memory is organized as a double-buffered memory, operating in a ping-pong manner where one copy is being displayed while the other copy is being updated.

Overlapping can be achieved by controlling the order in which the patches are written to the frame memory. The rearmost patches are written first and the frontmost patches are written last, such that the frontmost patches obscure the rearmost patches. For example, in FIG. 16B, the 11 and 12 of the object picture 1674 are written first, and the patches 1 and 2 of the object 1671 are written last such that the patches 1 and 2 of the picture object 1671 obscure the patches 11 and 12 of object 1674.

Animation or cinematic sequence of images can be achieved by repeatedly performing the updating or writing patches to frame memory. To cause the perception that the objects in the sequence are changing position or front-back order with respect to each other, the location of the images in the sequence is changed as the sequence progresses. To cause the perception that the objects in the sequence are changing in size, the size of images in the sequence is changed by varying the size parameters in the display controller.

Figure 17A:
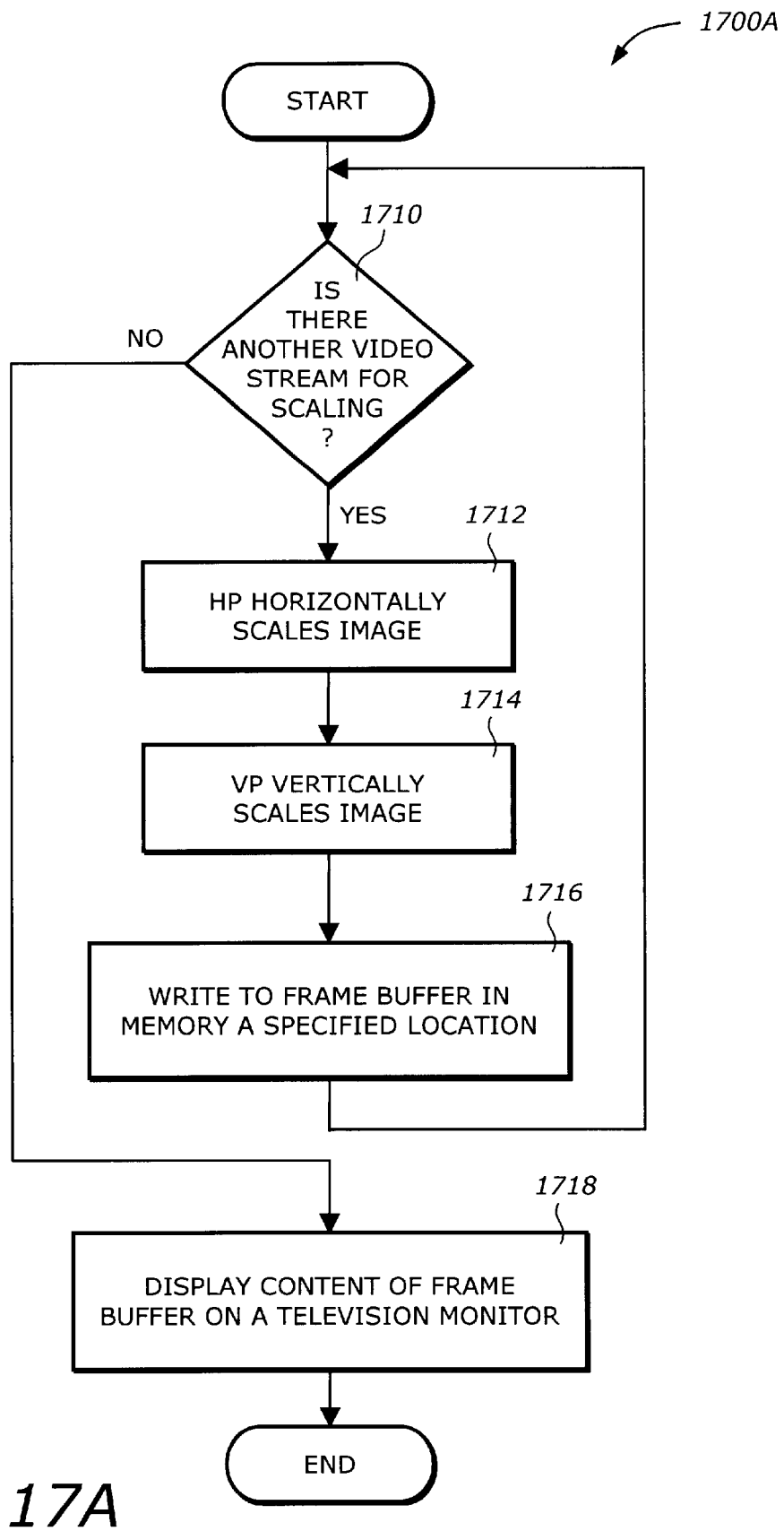
FIG. 17A is a flowchart illustrating a process to scale images from a decoded video stream according to one embodiment of the invention.

FIG. 17A is a flowchart illustrating a process 1700A to scale images from a decoded video stream according to one embodiment of the invention.

Upon START, the process 1700A determines if there is a next video stream (Block 1710). If YES, the HP scales the images horizontally (Block 1712). Then the VP scales the horizontally scaled image vertically (Block 1714). Note that although block 1712 is shown before block 1714, the order of the processing can be switched. Then the process 1700A writes the scaled image data into the frame buffer in the memory at the specified location (Block 1716). The process 1700A then comes back to block 1710 to determine if there are any more video streams.

If there is no more video stream as determined in block 1710, the process 1700A displays the content of the frame buffer on a television monitor. The content of the frame buffer may include results from other scaling and/or de-interlacing operations. The process 1700A is then terminated.

Figure 17B:
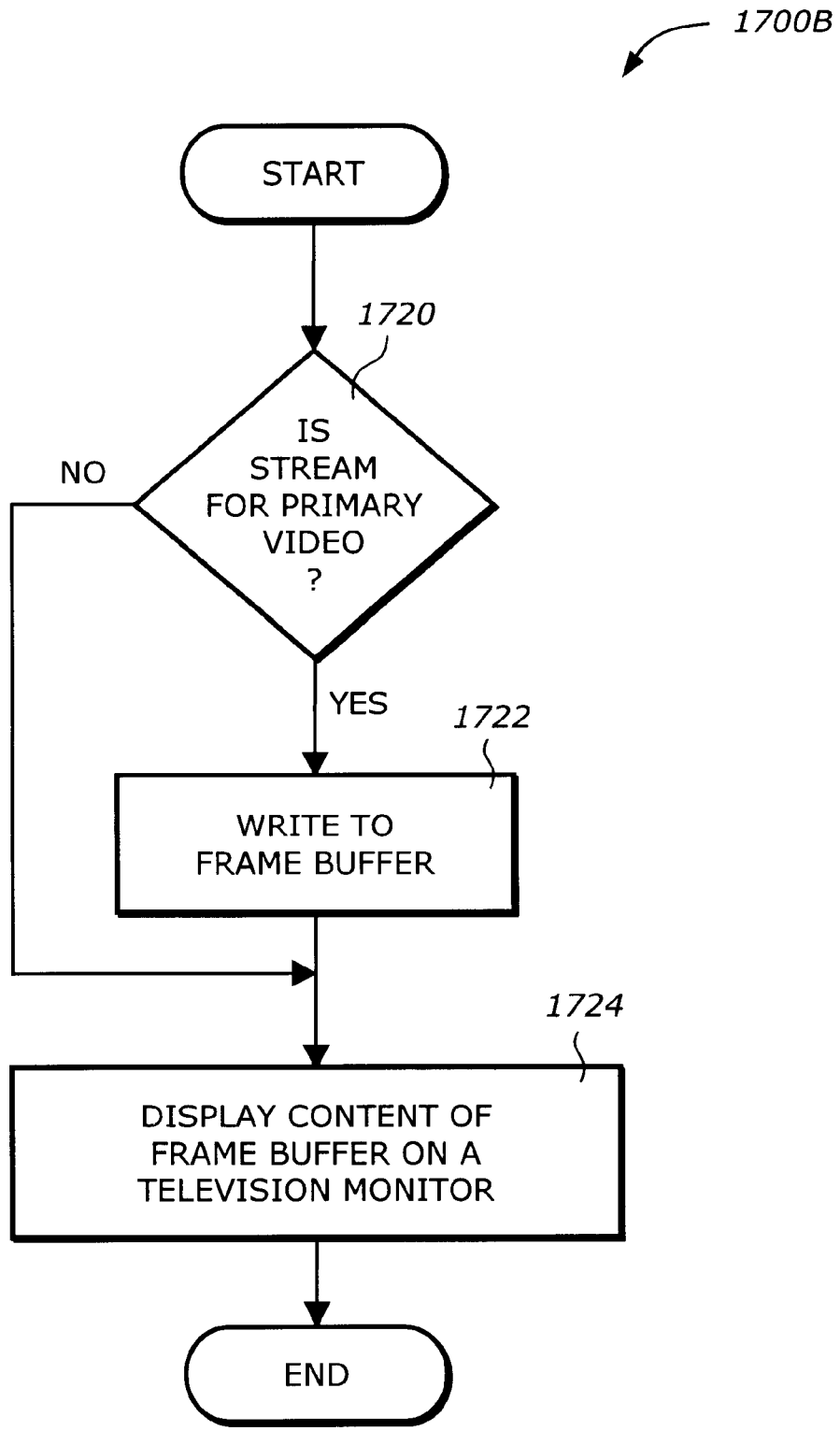
FIG. 17B is a flowchart illustrating a process to display one decoded video stream according to one embodiment of the invention.

FIG. 17B is a flowchart illustrating a process 1700B to display one decoded video stream according to one embodiment of the invention.

Upon START, the process 1700B determines if the stream is for the primary video (Block 1720). If YES, the process 1700B writes the video stream into the frame buffer (Block 1722). Then the process 1700B displays the content of the frame buffer on a television monitor. The content of the frame buffer may include results from other scaling and/or de-interlacing operations. The process 1700B is then terminated.

Figure 17C:
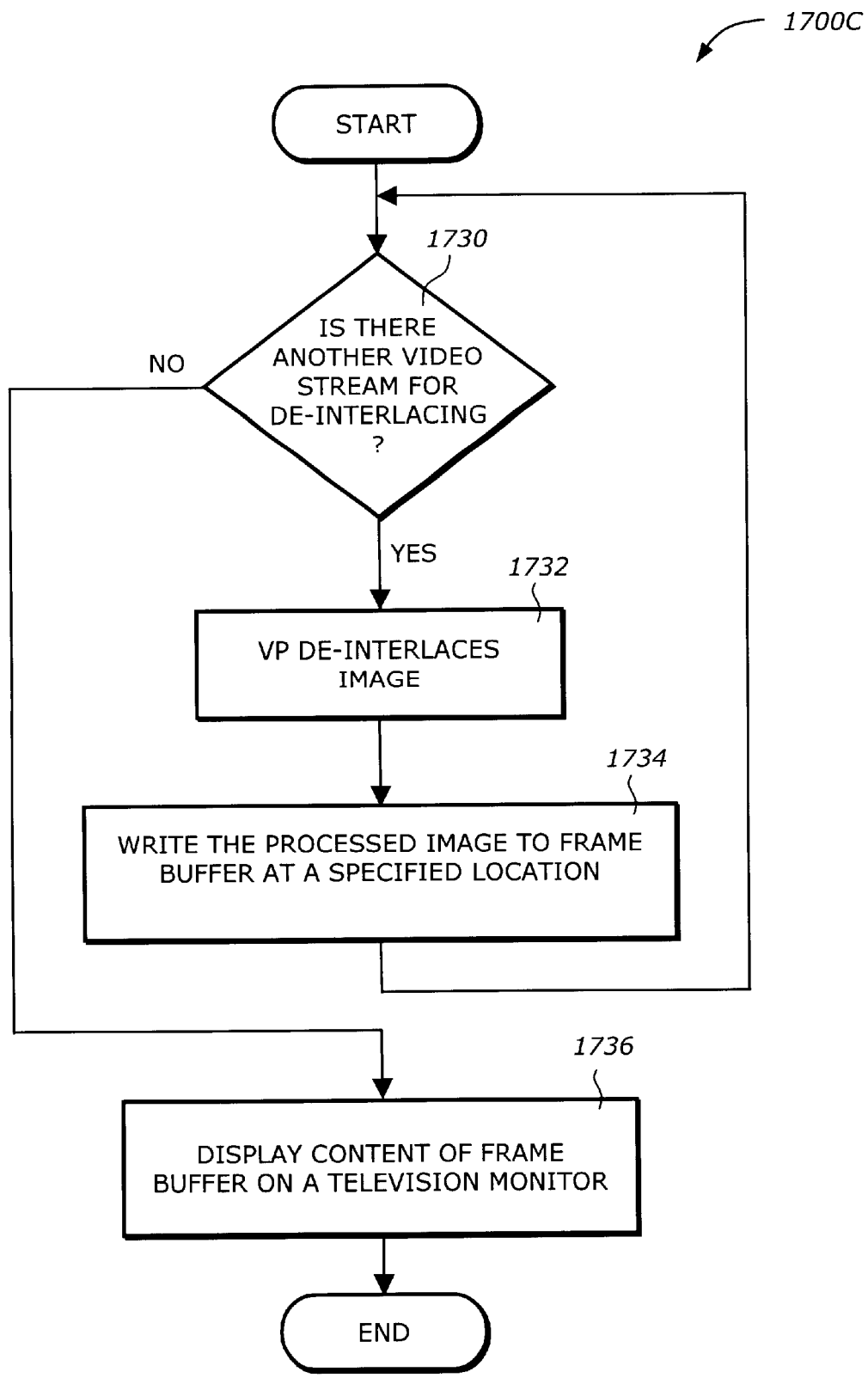
FIG. 17C is a flowchart illustrating a process to de-interlace images from a decoded video stream according to one embodiment of the invention.

FIG. 17C is a flowchart illustrating a process 1700C to de-interlace images from a decoded video stream according to one embodiment of the invention.

Upon START, the process 1700C determines if there is a next video stream (Block 1730). If YES, the VP de-interlaces the image (Block 1732). Then the process 1700C writes the de-interlaced image data into the frame buffer in the memory at the specified location (Block 1734). The process 1700C then comes back to block 1730 to determine if there are any more video streams.

If there are no more video streams as determined in block 1730, the process 1700C displays the content of the frame buffer on a television monitor. The content of the frame buffer may include results from other scaling and/or de-interlacing operations. The process 1700C is then terminated.

Therefore, the present invention is a technique to perform graphic and video operations effectively. The technique provides an architecture that performs horizontal and vertical filtering, and de-interlacing on the image data. The filtering operations perform down scaling and up scaling on patches of image data. On-chip buffers provide fast and efficient memory accesses. Format conversion is performed as a series of steps including scaling and/or de-interlacing.

For scan rate conversion, the technique includes up-scaling and downscaling in horizontal and vertical directions using horizontal and vertical filters. The horizontal up-scaling is performed by an in-line multi-tap horizontal filter. The vertical up-scaling is performed by an in-line multi-tap vertical interpolator. The horizontal down-scaling is performed by a patch-based horizontal band-limiting filter and interpolator. The vertical down-scaling is performed by a patch-based vertical band-limiting filter and interpolator.

For image scaling and format conversion, the technique includes the use of patches and scaling filters to convert from any input resolutions and scanning modes to any output resolutions and scanning modes. The patches are transferred from memory to local buffers for filtering. The image data from the patches are appropriately steered or organized/re-organized according to the image data organization.

For de-interlacing, the technique includes use of patches and motion detecting and interpolating. The patches are transferred from memory to local buffers for de-interlacing. The image data from the patches are appropriately steered or organized/re-organized according to the image data organization.

For image object compositing, the objects are written to the display using patches in any order to achieve the desired results. Patches are written to a frame memory to be displayed on a monitor. A number of results can be achieved including overlapping, separating, animating, cinematic, etc.

While this invention has been described with reference to illustrative embodiments, this description is not intended to be construed in a limiting sense. Various modifications of the illustrative embodiments, as well as other embodiments of the invention, which are apparent to persons skilled in the art to which the invention pertains are deemed to lie within the spirit and scope of the invention.

What is claimed is:

1. A method comprising:
   storing a source image data in a buffer, the storing comprises transferring a patch of the source image data from a memory to the buffer; and
   scaling the source image data using a scaling filter, the scaling comprises down-scaling the source image data using a patch-based filter, the down scaling comprising:
   band-limiting the source image data in the patch by an FIR filter, and
   re-sampling the band-limited patch of the source image data by an interpolator to generate a sub-sampled patch, the sub-sampled patch corresponding to a down-scaled image data.

2. The method of claim 1 wherein scaling further comprises:
   horizontally up-scaling the source image data using an in-line horizontal filter.

3. The method of claim 2 wherein the in-line horizontal filter is a multi-tap FIR filter having N taps.

4. The method of claim 3 wherein N=4.

5. The method of claim 1 wherein scaling further comprises:
   vertically up-scaling the source image using an in-line vertical filter.

6. The method of claim 5 wherein the in-line vertical filter is a multi-tap interpolator having N taps.

7. The method of claim 6 wherein N is one of 2 and 3.

8. An apparatus comprising:
   a buffer to store a source image data, the buffer storing a patch of the source image data from a memory; and
   a scaling filter coupled to the buffer to scale the source image data, the scaling filter comprising a patch-based down-scaling filter coupled to the buffer to down-scale the source image data, the down scaling filter comprising:
   a finite impulse response (FIR) filter coupled to the buffer to band-limit the source image data in the patch, and
   an interpolator coupled to the FIR filter to re-sample the band-limited patch of the source image data, the interpolator generating a sub-sampled patch, the sub-sampled patch corresponding to a down-scaled image data.

9. The apparatus of claim 8 wherein the scaling filter further comprises:
   an in-line horizontal filter coupled to the buffer to horizontally up-scaling the source image data.

10. The apparatus of claim 9 wherein the in-line horizontal filter is a multi-tap FIR filter having N taps.

11. The apparatus of claim 10 wherein N=4.

12. The apparatus of claim 8 wherein the scaling filter further comprises:
    an in-line vertical filter coupled to the buffer to vertically up-scale the source image.

13. The apparatus of claim 12 wherein the in-line vertical filter is a multi-tap interpolator having N taps.

14. The apparatus of claim 13 wherein N is one of 2 and 3.

15. A system comprising:
    a decoder to provide a source image data; and
    a filtering and format conversion unit (FFCU) coupled to the decoder to convert scan rates of image data in a memory, the FFCU comprising:
    a buffer to store the source image data, the buffer storing a patch of the source image data from a memory, and
    a scaling filter coupled to the buffer to scale the source image data, the scaling filter comprising a patch-based down-scaling filter coupled to the buffer to down-scale the source image data, the down scaling filter comprising:
    a finite impulse response (FIR) filter coupled to the buffer to band-limit the source image data in the patch, and
    an interpolator coupled to the FIR filter to re-sample the band-limited patch of the source image data, the interpolator generating a sub-sampled patch, the sub-sampled patch corresponding to a down-scaled image data.

16. The system of claim 15 wherein the scaling filter further comprises:
    an in-line horizontal filter coupled to the buffer to horizontally up-scaling the source image data.

17. The system of claim 16 wherein the in-line horizontal filter is a multi-tap FIR filter having N taps.

18. The system of claim 17 wherein N=4.

19. The system of claim 15 wherein the scaling filter further comprises:
    an in-line vertical filter coupled to the buffer to vertically up-scale the source image.

20. The system of claim 19 wherein the in-line vertical filter is a multi-tap interpolator having N taps.

21. The system of claim 20 wherein N is one of 2 and 3.

* * * * *